(12) United States Patent
Hessler et al.

(10) Patent No.: US 10,461,829 B2
(45) Date of Patent: Oct. 29, 2019

(54) MULTIPLE ACCESS METHOD IN A MASSIVE MIMO SYSTEM

(71) Applicant: TELEFONAKTIEBOLAGET LM ERICSSON (PUBL), Stockholm (SE)

(72) Inventors: Martin Hessler, Linköping (SE); Emil Björnson, Linköping (SE); Hei Victor Cheng, Linköping (SE); Erik G. Larsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/739,056

(22) PCT Filed: Jun. 26, 2015

(86) PCT No.: PCT/SE2015/050754
§ 371 (c)(1),
(2) Date: Dec. 21, 2017

(87) PCT Pub. No.: WO2016/209137
PCT Pub. Date: Dec. 29, 2016

(65) Prior Publication Data
US 2018/0183506 A1    Jun. 28, 2018

(51) Int. Cl.
*H04B 7/06* (2006.01)
*H04L 27/34* (2006.01)
(Continued)

(52) U.S. Cl.
CPC ......... *H04B 7/0617* (2013.01); *H04B 7/0452* (2013.01); *H04B 7/06* (2013.01);
(Continued)

(58) Field of Classification Search
None
See application file for complete search history.

(56) References Cited

U.S. PATENT DOCUMENTS

| 2008/0076477 A1 | 3/2008 | Hedayat et al. |
| 2010/0112952 A1* | 5/2010 | Molnar .......... H01Q 1/246 455/63.1 |

(Continued)

FOREIGN PATENT DOCUMENTS

| CN | 101106800 A | 1/2008 |
| CN | 102804631 A | 11/2012 |

(Continued)

OTHER PUBLICATIONS

European Search Report dated Jun. 6, 2018, issued in European Patent Application No. 15896484.1, 5 pages.

(Continued)

*Primary Examiner* — Michael J Moore, Jr.
(74) *Attorney, Agent, or Firm* — Rothwell, Figg, Ernst & Manbeck, P.C.

(57) ABSTRACT

A Radio Network Node (RNN) 110 and a method therein for improving capacity in a wireless communications system 100. The RNN is configured to serve a first wireless device 120 and a second wireless device (WD) 130. The RNN assigns a shared uplink pilot signal to the first and second WDs. Further, the RNN transmits, to the first WD, an indication of how possible second data intended for the second WD will be comprised in a signal to be transmitted to the first WD. Furthermore, the RNN estimates a combined channel based on a received shared uplink pilot signal from the first WD and/or the second WD. Yet further, the RNN determines a beamforming vector for the estimated combined channel; and transmits the signal to the first WD, wherein the signal comprises first data and the possible second data, which first data is decodable only by the first WD.

20 Claims, 11 Drawing Sheets

(51) Int. Cl.
*H04B 7/0452* (2017.01)
*H04L 5/00* (2006.01)

(52) U.S. Cl.
CPC ........ *H04L 5/0048* (2013.01); *H04L 27/3416* (2013.01); *H04L 27/3477* (2013.01); *H04L 27/3455* (2013.01)

(56) References Cited

U.S. PATENT DOCUMENTS

| | | | |
|---|---|---|---|
| 2011/0090986 A1* | 4/2011 | Kwon | H04B 7/0413 375/295 |
| 2011/0176442 A1* | 7/2011 | Ihm | H04B 7/0619 370/252 |
| 2011/0194637 A1 | 8/2011 | Jiang et al. | |
| 2012/0113953 A1* | 5/2012 | Papadopoulos | H04B 7/024 370/330 |
| 2016/0262181 A1 | 9/2016 | Lee et al. | |
| 2017/0187430 A1* | 6/2017 | Moosavi | H04B 7/0413 |
| 2017/0339716 A1* | 11/2017 | Moosavi | H04L 5/0048 |
| 2017/0373807 A1* | 12/2017 | Hessler | H04L 5/005 |
| 2018/0076937 A1* | 3/2018 | Nasiri Khormuji | H04L 5/0048 |
| 2018/0309554 A1* | 10/2018 | Moosavi | H04L 5/0051 |

FOREIGN PATENT DOCUMENTS

| | | |
|---|---|---|
| CN | 103546264 A | 1/2014 |
| CN | 104640222 A | 5/2015 |
| EP | 2079209 A1 | 7/2009 |
| WO | 2008154506 A1 | 12/2008 |
| WO | 2014/058375 A2 | 4/2014 |
| WO | 2015060548 A1 | 4/2015 |
| WO | 2015073493 A1 | 5/2015 |

OTHER PUBLICATIONS

Khormuji "Generalized Semi-Orthogonal Multiple-Access for Massive MIMO" 2015 IEEE 81st Vehicular Technology Conference (VTC Spring), Jan. 1, 2015, 5 pages.

International Search Report and Written Opinion dated Mar. 9, 2016, in International Application No. PCT/SE2015/050754, 15 pages.

Bie Z et al., "A Hybrid Multiple Access Scheme for Next Generation Wireless Communication", Beijing University of Post and Telecommunications, Global Telecommunications Conference, (Nov. 27, 2006), 5 pages.

Chinese Search Report, issued in corresponding Chinese Application No. 201580081145.1, dated Aug. 21, 2019, 3 pages.

First Chinese Office Action, issued in corresponding Chinese Application No. 201580081145.1, dated Sep. 2, 2019, 12 pages.

\* cited by examiner

Fig. 3 Method in Radio Network Node (RNN) 110

Fig. 5 Method in first Wireless Device (1st WD) 120

MULTIPLE ACCESS METHOD IN A MASSIVE MIMO SYSTEM

CROSS REFERENCE TO RELATED APPLICATION(S)

This application is a 35 U.S.C. § 371 National Phase Entry Application from PCT/SE2015/050754, filed Jun. 26, 2015, designating the United States, the disclosure of which is incorporated herein in its entirety by reference.

TECHNICAL FIELD

Embodiments herein relate generally to a radio network node, a wireless device and to methods therein. In particular they relate to the improvement of capacity in a wireless communications system.

BACKGROUND

Communication devices such as terminals are also known as e.g. User Equipments (UE), mobile terminals, wireless devices, wireless terminals and/or mobile stations. Terminals are enabled to communicate wirelessly in a wireless communications network and/or cellular communication system, sometimes also referred to as a cellular radio system or cellular network. The communication may be performed e.g. between two terminals, between a terminal and a regular telephone and/or between a terminal and a server via a Radio Access Network (RAN) and possibly one or more core networks, comprised within the wireless communications network.

Terminals may further be referred to as mobile telephones, cellular telephones, laptops, or tablets with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area is served by a radio network node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations or radio nodes communicate over the air interface operating on radio frequencies with the communication devices, also denoted wireless devices, within range of the base stations or radio nodes. In the context of this disclosure, the expression Downlink (DL) is sometimes herein used for the transmission path from the radio node, e.g. a base station, to the wireless device. However, it should be understood that DL may sometimes herein be used for the transmission path from a node controlling the radio interface to the wireless device. The expression Uplink (UL) is used for the transmission path in the opposite direction i.e. from the wireless device to the radio node. Further, UL may sometimes be used for the transmission path from the wireless device to the node controlling the radio interface. The radio network node may in some circumstances, e.g. in systems enabling device-to-device (D2D) communications, also be another wireless device. A transmission path in a D2D communication is a transmission path between two nodes, which nodes are not in control of the radio interface.

Mobile data traffic is growing exponentially due to the enormous success of smart phones, tablets and other data traffic appliances. The traditional way for increasing the data rate have been to increase the transmission bandwidth. However, the spectrum has become scarce due to the increase in wireless communications systems and hence the main challenge for the future wireless communications systems is to find alternative solutions to meet high demands on the data rate. One way of handling the increased wireless data traffic is to deploy more base stations and densify the wireless communications systems. This would however increase interference and deployment cost. Another option for increasing the data rate is to introduce large antenna arrays at the base station. Such an option seems to be simpler in terms of deployment cost. The base station, having an excessive number of antennas, can simultaneously schedule multiple terminals at the same time-frequency band with simple linear processing such as Maximum-Ratio Transmission (MRT) or Zero-Forcing (ZF) in the downlink and Maximum-Ratio Combining (MRC) or ZF in the uplink. This is often referred to as massive Multi-User (MU) Multiple-Input-Multiple-Output (MIMO), and is abbreviated by massive MIMO hereafter.

The biggest challenge in deploying massive MIMO is how to acquire Channel State Information (CSI) which is very essential to gain the potentials of the excessive amount of transmit antennas at the base station. Traditionally, each terminal, thanks to the pilot symbols transmitted during downlink phase, estimates the channel gain and feeds it back to the base station via a reverse link. Since the number of required pilots in the downlink is proportional to the number of base station antennas, these schemes for obtaining CSI might require a fair amount of signaling overhead. The idea is therefore to operate in the Time-Division Duplex (TDD) mode and rely on the channel reciprocity between the uplink and the downlink. More precisely, each terminal transmits pilot symbols in the uplink phase, which are then used by the base station to estimate the channel in both directions. The amount of required pilots is thus equal to the number of active terminals, which is typically much smaller than the number of base station antennas for simultaneous data transmissions. But for the number of connected terminals to the base station, the number of users can be much larger than the number of antennas. This, on the other hand, introduces a new challenge in assigning a limited amount of UL-pilots to different users. Many of which users will not need to do any data transmissions, but the wireless communications system might still need CSI for these users, for example, to enable fast activation.

One fundamental assumption in MU-MIMO and massive MIMO is that the base station can acquire sufficiently accurate CSI to the terminals. Then it can perform coherent downlink beam-forming based on the acquired CSI. Many different kinds of CSI acquisition and beam-forming techniques can be found in the literature. Consider a base station with M antennas that serves K terminals, where each terminal has a single antenna. Let $h_k$ be an M-vector that represents the channel response of terminal k in a particular resource block. Within one resource block, also called a coherence interval in the massive MIMO literature, the channel is roughly constant over the time-frequency space.

The length T of the resource block in number of symbols is assumed equal or smaller to the coherence time multiplied with the coherence bandwidth. Then, in the downlink, the base station transmits a linear combination of the beam-formed signal vectors at each sample time t:

$$\sum_{k=1}^{K} a_k \sqrt{\gamma_k} s_k(t) \quad (1)$$

where $\{a_k\}$ are beam-forming vectors associated with each of the K terminals, $\{\gamma_k\}$ are the corresponding power control parameters, and $s_k(t)$ are symbols intended for terminal k. The beam-forming vectors $\{a_k\}$ are chosen as functions of the (estimated) channel responses $\{h_k\}$ to maximize performance. Within a coherence block, up to T downlink data symbols $\{s_k(1), \ldots, s_k(T)\}$ can be conveyed to each terminal k, but some symbols are typically reserved for other purposes.

For large antenna arrays, coherent beam-forming is used by the base station, e.g. a Radio Network Node (RNN), array to focus the emitted power onto the specific geographical positions of the terminals, e.g. the wireless devices. In practice the beam-forming operation requires that the RNN acquires information of the channel responses to the wireless devices and new estimates are required roughly once in every coherence block due to natural channel variations. In Time-Division Duplex (TDD) systems, this is typically done by sending uplink pilots in each resource block to estimate the current channel responses to the wireless devices. This requires that each wireless device uses a unique pilot. The number of orthogonal pilots is limited by the amount of time-frequency resources spent on the pilot transmission, which is fundamentally limited by the number of symbols, T, per resource block. In practice this channel knowledge gives the antenna beam-forming gain for the wireless device.

The pilot transmissions also add a pre-log penalty to the rate performance, in the sense that not all symbols in a coherence block may carry data. In high mobility scenarios, when the wireless devices are moving with high velocity, the resource block is relatively small and therefore the amount of resources that may be dedicated for pilots is scarce.

The overall rate performance will then be small, either because of the large pre-log penalty of serving many wireless devices or because only a small number of wireless devices may be served to limit the pre-log penalty.

SUMMARY

Therefore, an object of embodiments herein is to provide a way of improving the performance in a wireless communications system.

According to a first aspect of embodiments herein, the object is achieved by a method performed by a Radio Network Node (RNN) for improving capacity in a wireless communications system. The RNN serves a first wireless device and a second wireless device in the wireless communications system.

The RNN assigns a shared uplink pilot signal to the first wireless device and to the second wireless device.

Further, the RNN transmits, to the first wireless device, an indication of how possible second data intended for the second wireless device will be comprised in a signal to be transmitted from the RNN to the first wireless device.

Furthermore, the RNN estimates a combined channel based on a received shared uplink pilot signal from the first wireless device and/or the second wireless device, and determines a beamforming vector for the estimated combined channel.

Yet further, the RNN transmits, by means of the beamforming vector, the signal to the first wireless device, wherein the signal comprises first data and the possible second data, which first data is decodable only by the first wireless device.

According to a second aspect of embodiments herein, the object is achieved by a Radio Network Node (RNN) for improving capacity in a wireless communications system. The RNN is configured to serve a first wireless device and a second wireless device in the wireless communications system.

The RNN is configured to assign a shared uplink pilot signal to the first wireless device and to the second wireless device.

Further, the RNN is configured to transmit, to the first wireless device, an indication of how possible second data intended for the second wireless device will be comprised in a signal to be transmitted from the RNN to the first wireless device.

Furthermore, the RNN is configured to estimate a combined channel based on a received shared uplink pilot signal from the first wireless device and/or the second wireless device, and to determine a beamforming vector for the estimated combined channel.

Yet further, the RNN is configured to transmit, by means of the beamforming vector, the signal to the first wireless device, wherein the signal comprises first data and the possible second data, which first data is decodable only by the first wireless device.

According to a third aspect of embodiments herein, the object is achieved by a method performed by a first wireless device for improving capacity in a wireless communications system. A Radio Network Node (RNN) serves the first wireless device and a second wireless device in the wireless communications system.

The wireless device receives, from the RNN, an assignment of a shared uplink pilot signal to be used, wherein the shared uplink pilot signal is shared with the second wireless device.

Further, the wireless device transmits the shared uplink pilot signal to the RNN.

Furthermore, the wireless device receives, from the RNN, an indication of how possible second data intended for the second wireless device will be comprised in a signal to be transmitted from the RNN to the first wireless device.

Yet further, the wireless device receives, from the RNN, the signal. The signal comprises first data and the possible second data, wherein the first data is decodable only by the first wireless device.

The wireless device decodes the first data from the received signal taking into account the indication of how the possible second data is comprised in the received signal.

According to a fourth aspect of embodiments herein, the object is achieved by a first wireless device for improving capacity in a wireless communications system. A Radio Network Node (RNN) is configured to serve the first wireless device and a second wireless device in the wireless communications system.

The wireless device is configured to receive, from the RNN, an assignment of a shared uplink pilot signal to be used, wherein the shared uplink pilot signal is shared with the second wireless device.

Further, the wireless device is configured to transmit the shared uplink pilot signal to the RNN.

Furthermore, the wireless device is configured to receive, from the RNN, an indication of how possible second data intended for the second wireless device will be comprised in a signal to be transmitted from the RNN to the first wireless device.

Yet further, the wireless device is configured to receive, from the RNN, the signal. The signal comprises first data and the possible second data, wherein the first data is decodable only by the first wireless device.

The wireless device is configured to decode the first data from the received signal taking into account the indication of how the possible second data is comprised in the received signal.

According to a fifth aspect of embodiments herein, the object is achieved by a computer program, comprising instructions which, when executed on at least one processor, causes the at least one processor to carry out the method performed by the RNN.

According to a sixth aspect of embodiments herein, the object is achieved by a computer program, comprising instructions which, when executed on at least one processor, causes the at least one processor to carry out the method performed by the wireless device.

According to a seventh aspect of embodiments herein, the object is achieved by a carrier comprising the computer program, wherein the carrier is one of an electronic signal, an optical signal, a radio signal or a computer readable storage medium.

Since the RNN assigns a shared uplink pilot signal to the first and second wireless devices, since the RNN transmits, to the first wireless device, an indication of how possible second data intended for the second wireless device will be comprised in a signal to the first wireless device, since the RNN estimates a combined channel based on a received shared uplink pilot signal from the first and/or second wireless device and determines a beamforming vector for the estimated combined channel, the RNN is able to transmit, by means of the beamforming vector, the signal to the first wireless device, wherein the signal comprises first data and the possible second data, which first data is decodable only by the first wireless device, the RNN thereby avoides time and/or frequency multiplexing of the first and second wireless devices. This results in an improved capacity in the wireless communication system and thus in an improved performance in the wireless communications system.

An advantage with embodiments herein is that they enable better multiplexing of wireless devices for large antenna arrays as compared to the prior art communications systems.

BRIEF DESCRIPTION OF DRAWINGS

Examples of embodiments herein are described in more detail with reference to attached drawings in which.

DETAILED DESCRIPTION

Figure 1:
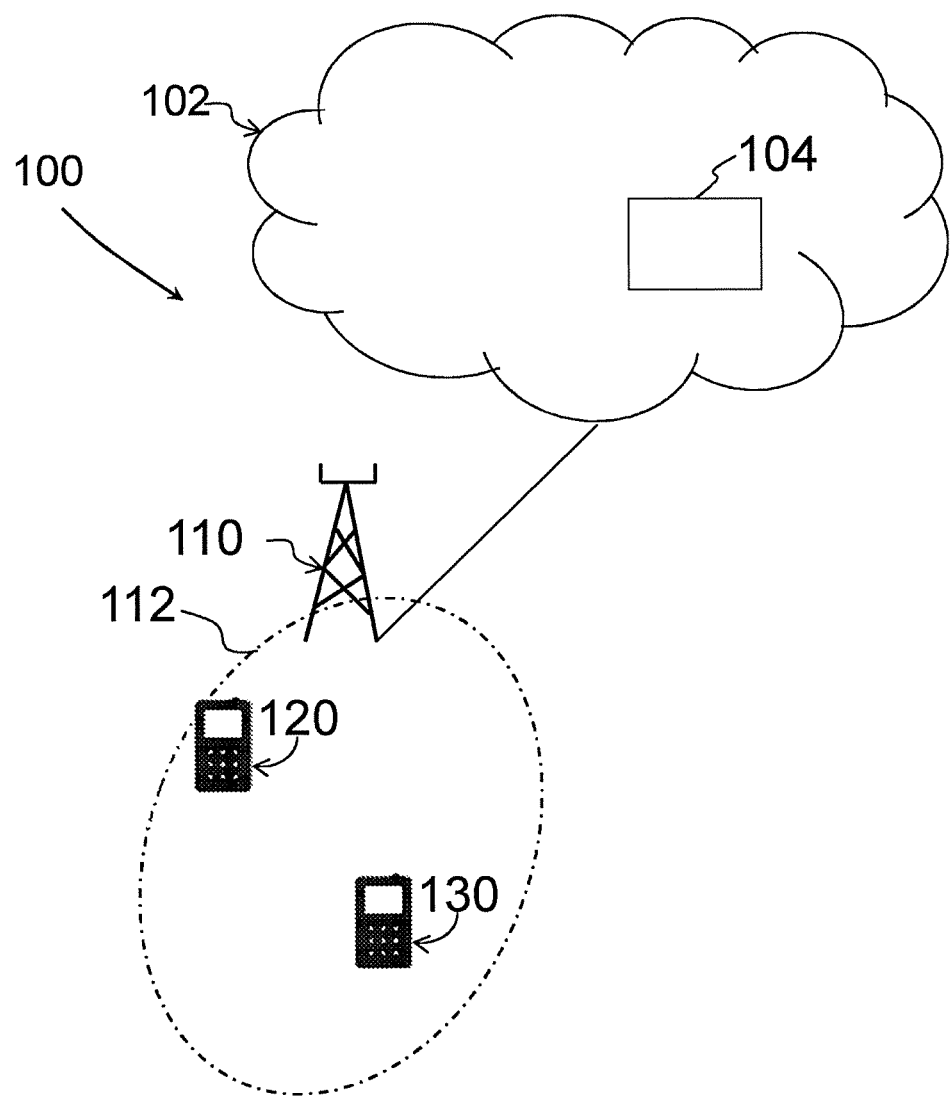
FIG. 1 schematically illustrates an embodiment of a wireless communications system.

As part of developing embodiments herein, some problems with the state of the art communications systems will first be identified and discussed.

For large antenna arrays, coherent beam-forming is used by the base station, e.g. the RNN, array to focus the emitted power onto the specific geographical positions of the terminals, e.g. the wireless devices. In practice the beam-forming operation requires that the RNN acquires information of the channel responses to the wireless devices and new estimates are required roughly once in every coherence block due to natural channel variations. In Time-Division Duplex (TDD) systems, this is typically done by sending uplink pilots, e.g. uplink pilot signals, in each resource block to estimate the current channel responses $h_k$ to the wireless devices. This requires that each wireless device uses a unique pilot. The number of orthogonal pilots is limited by the amount of time-frequency resources spent on the pilot transmission, which is fundamentally limited by the number of symbols, T, per resource block. In practice this channel knowledge gives the antenna beam-forming gain for the wireless device.

The pilot transmissions also add a pre-log penalty to the rate performance, in the sense that not more than $T-\beta K$ of the T symbols in a coherence block can carry data. The overhead coefficient $\beta$ is equal to 2 if pilots are sent in both the uplink and the downlink, and equal to 1 if only uplink pilots are used and the downlink channels are estimated blindly. In high mobility scenarios, when wireless devices are moving with high velocity, the resource block is relatively small and therefore the amount of resources that may be dedicated for pilots is scarce.

The overall rate performance will then be small, either because of the large pre-log penalty of serving many wireless devices or because only a small number of wireless devices may be served to limit the pre-log penalty.

Specifically, consider a case when a RNN needs to serve a certain number of wireless devices, among which some are located close to the RNN while the remaining ones are far away. Then due to the short resource block, the RNN has to divide them over more than one resource block which significantly degrades the per-terminal rate performance since each wireless device can only receive data in one of these resource blocks.

Meanwhile, for the wireless devices close to the RNN, they have a Signal-to-Noise-Ratio (SNR) that is high and massive MIMO provides an array gain of M, which makes the effective receive SNR even higher. However, these wireless devices cannot enjoy the very high rates promised by the information theoretic rate expressions, because of practical limits on the modulation size. The benefit of high received power is essentially wasted when the Signal-to-Interference-plus-Noise-Ratio (SINR) goes beyond some tens of dBs, because of the impractically large constellation sizes that would be needed and the large required dynamic range of the transceiver.

In existing solutions there are techniques, as described, that utilize either that each wireless device is assigned a unique uplink pilot, or that the wireless device listens to downlink pilots and makes a cell selection procedure. This implies that for massive MIMO systems either there is a very large need for many unique and preferably orthogonal pilots or that costly procedures are deployed where the wireless device make cell or beam selection based upon downlink pilots. For the second case either narrow beams are used which implies that the wireless devices need to do frequency downlink measurements or more broad beams are used meaning that much less beam-forming gain is realized for all data transmissions utilizing the beam selected by the wireless device. This downlink procedure is especially costly or even impossible in high mobility scenarios and under near isotropic fading.

Therefore, as mentioned above, according to embodiments herein, a way of improving the performance in a wireless communications system is provided.

Below, embodiments herein will be illustrated in more detail by a number of exemplary embodiments. It should be noted that these embodiments are not mutually exclusive. Components from one embodiment may be tacitly assumed to be present in another embodiment and a person skilled in the art will realize how those components may be used in the other exemplary embodiments.

As schematically illustrated in FIG. 1 embodiments herein relate to a wireless communications system 100, such as a wireless communications network or a cellular communications network. The wireless communications system 100 may be an LTE network, a WCDMA network, an GSM network, any 3GPP cellular network, Wimax, or any other wireless communications network or system.

A core network 102 may be configured to operate in the wireless communications system 100 The core network 102 may be an LTE Core network, e.g. a System Architecture Evolution (SAE) network, a WCDMA core network, an GSM core network, any 3GPP cellular core network, a Wimax core network, or any other wireless communications core network or system.

Further, a core network node 104 may be configured to operate in the wireless communications system 100. The core network node 104 may be an LTE core network node, a WCDMA core network node, an GSM core network node, any 3GPP cellular core network node, a Wimax core network node, or any other wireless communications core network or system node.

A Radio Network Node (RNN) 110 is configured to operate in the wireless communications system 100. The RNN 110 is configured for wireless communication with one or more wireless devices, such as wireless devices 120, 130, when they are located within a geographical area 112 served by the RNN 110.

The RNN 110 may be a transmission point such as a radio base station, for example an eNodeB, also denoted eNB, a Home eNodeB, or a NodeB or any other network node capable to serve a wireless device, e.g. a user equipment or a machine type communication device in a wireless communications system, such as the wireless communications system 100. In case of device-to-device (D2D) communication providing e.g. CSI measurement, the RNN 110 may be a wireless device. In such embodiments, the RNN 110 may be referred to as a third wireless device.

A first wireless device 120 and a second wireless device 130, herein also referred to as a user equipment or UE, operates in the wireless communications system 100. The wireless device 120,130 may e.g. be a user equipment, a mobile terminal or a wireless terminal, a mobile phone, a computer such as e.g. a laptop, a Personal Digital Assistant (PDA) or a tablet computer, sometimes referred to as a tablet, with wireless capability, or any other radio network unit capable of communicating over a radio link in the wireless communications system 100. Please note that the term user equipment used in this document also covers other wireless devices such as Machine-to-Machine (M2M) devices, even though they may not have any user.

Sometimes herein the first wireless device 120 is referred to as a high path loss wireless device. This may for example be the case when the first wireless device 120 is arranged far away from the RNN 110.

Further, sometimes herein the second wireless device 130 is referred to as a low path loss wireless device. This may for example be the case when the second wireless device 130 is arranged close to the RNN 110. However, it should be understood that the first wireless device 120 may be located close to the RNN 110 and thus be the low path loss device while the second wireless device 130 may be located far away from the RNN 100 and thus be the high path loss device.

Some embodiments herein relate to a method that enable an increase in the number of wireless devices supported in the wireless communications system 100 by reducing the amount of pilot resources needed for the set of wireless devices. The method may be utilized to increase the spectral efficiency compared to normal user multiplexing, such as frequency and/or time domain user multiplexing, and also enable better utilization of large antenna arrays for future wireless communications system 100.

In order to increase the spectral efficiency in the multiuser massive MIMO downlink, and in some embodiments herein, the wireless devices in a given cell are grouped into pairs in such a way that two wireless devices, e.g. first and second wireless devices 120,130, in a pair have different path losses, e.g., one is close to the RNN 110, and the other is far away from the RNN 110. Wireless devices in the same pair are assigned the same uplink and downlink pilot sequence and power control is applied to both the pilot and the data transmission. In the uplink, the RNN 110 estimates a linear combination of the channels of the two wireless devices in each pair. Downlink transmission then proceeds by simultaneous beam-forming to both wireless devices in each pair utilizing super-positioning of the data transmissions to the two wireless devices. The super-positioning may be with correct power distribution between the two wireless devices when forming the constellations.

In order to support many wireless devices for a shared control channel, a set of at least two wireless devices are assigned the same UL pilot. Then data, e.g. a mix of control and data, is jointly transmitted to the wireless devices in the set where at least some of the data is exclusively transmitted to one of the wireless device. In some embodiments, the downlink data comprises in some cases an assignment of a new UL-pilot, e.g. a dedicated uplink pilot signal, to at least one of the wireless devices in the set. This wireless device may, for example, be a wireless device with a large amount of downlink data. The number of wireless devices sharing a resource and the power distribution between the wireless devices may be optimized according the path loss of the wireless device. This will be described in more detail below.

Figure 2:
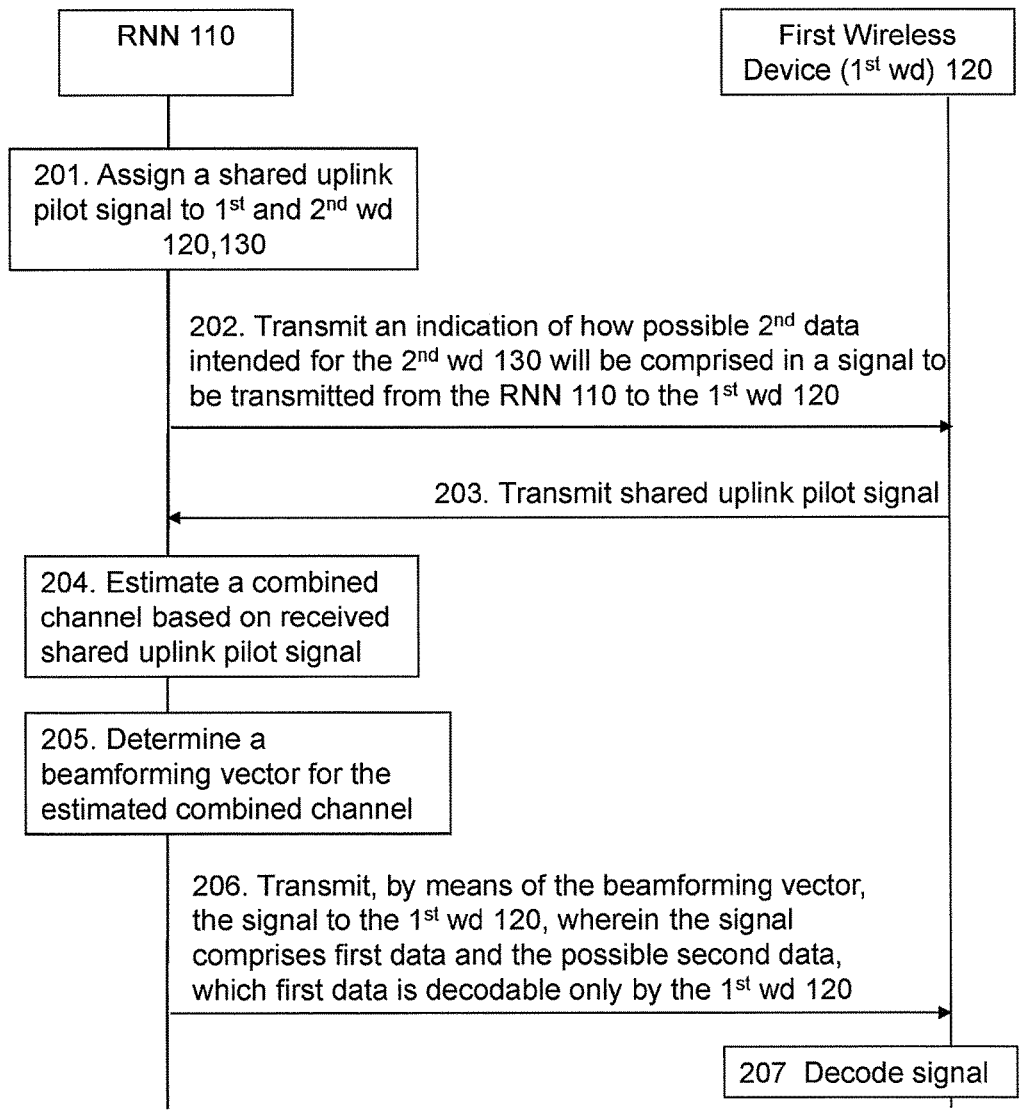
FIG. 2 is a schematic combined flowchart and signalling scheme of embodiments of a wireless communications system.

Methods performed by the wireless communications system 100 for improving capacity in the wireless communications system will now be described with reference to a combined flowchart and signalling scheme depicted in FIG. 2. The RNN 110 is configured to serve the first wireless device 120 and the second wireless device 130.

The methods comprise one or more of the following actions. It should be understood that actions may be taken in any suitable order and that actions may be combined.

Action 201

The RNN 110 assigns a shared uplink pilot signal to the first and second wireless devices 120,130. Thereby, the amount of pilot resources needed to support a two wireless devices, e.g. the first and second wireless devices 120,130, arranged in pairs is reduced by a factor 2. However, it should be understood that the amount of pilot resources needed to support a number of wireless devices is reduced by another factor in dependence of the number of wireless devices that are grouped and assigned the same shared uplink pilots signal. If for example, three wireless devices are grouped and assigned the same shared uplink pilot signal, the amount of pilot resources is reduced by a factor 3.

Action 201 relates to Action 303 which will be described below.

Action 202

The RNN 110 transmits an indication of how possible second data Data2 intended for the second wireless device 130 will be comprised in a signal to be transmitted from the RNN 110 to the first wireless device 120. As will be described below, the first wireless device 120 may use this indication when decoding a received signal to remove the second data Data2 intended for the second wireless device 130 from the signal in order to obtain first data Data1 comprised in the signal and intended for the first wireless device 120.

The expression "possible second data Data2" when used herein should be interpreted as the second data Data2 does not have to be transmitted and thus does not have to be comprised in the signal but could be transmitted and thus could be comprised in the signal. Therefore, the second data Data2 is referred to as possible second data Data2. Sometimes herein the possible second data Data2 is referred to as just second data Data2.

Action 202 relates to Action 304 which will be described below.

Action 203

The first wireless device 120 transmits the shared uplink pilot signal to the RNN 110, e.g. via a first channel. Thereby, the RNN 110 receives information, e.g. CSI, about the uplink channel.

Action 203 relates to Action 503 which will be described below.

Action 204

The RNN 110 estimates a combined channel based on the received shared uplink pilot signal from the first wireless device 120 and/or the second wireless device 130. Thus, based on the received information, e.g. received CSI, the RNN 110 estimates a combined channel to be used for transmissions to the first wireless device 120 and/or the second wireless device 130.

Action 204 relates to Action 306 which will be described below.

Action 205

The RNN 110 determines a beamforming vector for the estimated combined channel. As will described in Action 206 below, the determined beamforming vector will be used for transmissions to the first wireless device 120 and/or the second wireless device 130.

Action 205 relates to Action 307 which will be described below.

Action 206

The RNN 110 transmits, by means of the beamforming vector, the signal to the first wireless device 120, wherein the signal comprises first data Data1 and the possible second data Data2, which first data Data1 is decodable only by the first wireless device 120.

Action 206 relates to Action 311 which will be described below.

Action 207

The first wireless device 120 decodes the first data Data1 from the received signal taking into account the indication of how the possible second data Data2 is comprised in the received signal. For example, the first wireless device 120 may use the indication mentioned in Action 202 above when decoding the received signal to remove the second data Data2 intended for the second wireless device 130 from the signal in order to obtain first data Data1 comprised in the signal and intended for the first wireless device 120.

Action 207 relates to Action 507 which will be described below.

Some embodiments herein introduces an additional fundamental multiplexing mechanism that may increase the spectral efficiency when many wireless devices as compared to the coherence block size T are present in the wireless communications system 100 at the same time. With a large number of simultaneous wireless devices, embodiments herein may avoid time multiplexing of wireless devices by utilizing UL-pilot sharing, for example, for the wireless devices that are paired in dependence of their path loss.

Another advantage with embodiments herein is that they enable the RNN 110 to serve more wireless devices in the same time-frequency resource than any other state of the art communications system. For example, embodiments herein may substantially improve the efficiency of using the time-frequency resources, in particular by achieving higher sum spectral efficiency. The performance is also improved in the way that the overhead of acquiring the CSI of the wireless devices is reduced. Embodiments may also make use of the impractically high theoretical rate for the closer wireless devices to serve the wireless devices at the cell edge which are far away from the RNN with both wireless devices getting a reasonable rate. This also introduces a new form of multiple access scheme using massive MIMO systems.

Another advantage is when wireless devices are in need of beam-forming gain, for example, in a high mobility scenario. In such scenario a set of wireless devices may share UL-pilots and may thus obtain beam-forming gains for, for example, control signaling and/or initial data transmissions. Using traditional techniques, a 400 antenna array may be at a 26 dB disadvantage for initial transmissions without CSI, while with embodiments herein this disadvantage may be partially removed. For example, by letting 10 wireless devices share UL pilot with equal power, only a 10 dB disadvantage needs to be overcome for the worst case scenario when only 1 wireless device out of 10 wireless devices sharing the resource wants to decode the transmitted data. This implies that for joint data no or very small penalty would be foreseen, hence any attached joint control policy in the DL transmission would be very efficient when more than one wireless device has simultaneous data transmission using embodiments described herein. This enables very low latency transmissions which is one other corner stone for the 5G technologies wanting to support, for example, the tactile internet use-case, e.g. less than 1 ms latency.

Figure 3:
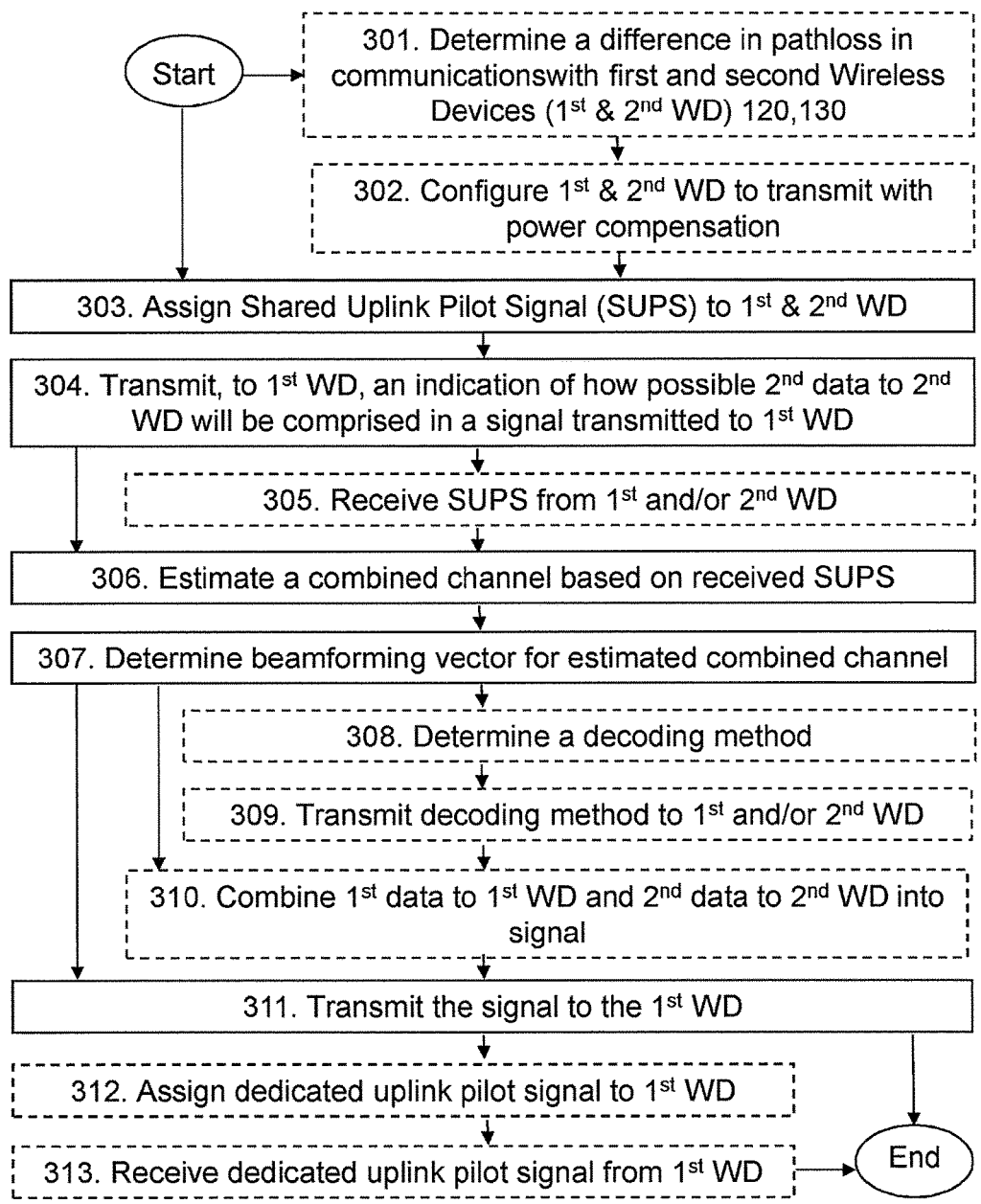
FIG. 3 is a flowchart depicting embodiments of a method performed by a radio network node.

Methods performed by the RNN 110 for improving capacity in the wireless communications system 100, will now be described with reference to the flow chart depicted in FIG. 3. As previously described, the RNN 110 serves the first wireless device 120 and the second wireless device 130 in the wireless communications system 100.

The method comprises one or more of the following actions. It should be understood that actions may be taken in any suitable order and that actions may be combined.

Action 301

In some embodiments, the RNN 110 determines a difference in path loss between the respective first and second wireless devices 120,130 and the RNN 110.

For example, wireless devices operating in the wireless communications system 100 are grouped into pairs such that one of the wireless devices in a pair, e.g. the first wireless device 120, is located close to the RNN 110 while the other wireless device, e.g. the second wireless device 130, is located far away from the RNN 110.

Action 302

In some embodiments, the RNN 110 configures the first and second wireless devices 120,130 to transmit the shared uplink pilot signal with a power compensation for the difference in path loss. Thereby, the received power of the respective signal from the first and second wireless devices 120,130 is almost equal or in accordance with a predetermined formula. For example, in accordance with a predetermined formula to achieve an almost equal received power in the downlink transmission using the combined channel, e.g. using the downlink precoding, e.g. the beamforming vector, derived from the shared uplink pilot signal.

Action 303

The RNN 100 assigns a shared uplink pilot signal to the first wireless device 120 and to the second wireless device 130.

In some embodiments, the RNN 110 assigns the shared uplink pilot signal when a first path loss in a first communication between the first wireless device 120 and the RNN 110 is larger than a first threshold value, wherein a second path loss in a second communication between the second wireless device 130 and the RNN 110 is smaller than a second threshold value, and wherein the first threshold value is larger than the second threshold value. The difference in path loss insures that super positioning coding will have improved spectral efficiency as compared to time and/or frequency multiplexing.

The second threshold value may be selected in relation to the first threshold value such that a spectral efficiency is improved compared to frequency multiplexing. This threshold may, for example, be estimated from a Shannon capacity, e.g. from an SINR to get a throughput value. The SINR estimation may, for example, be done by assigning a respective optimized amount of power P1 and P2 for the first and second wireless devices 120,130, respectively. For example, the respective optimized amount of power P1 and P2 may be related to the size of the two constellations in the super positioning coding. Wherein the respective optimized amount of power P1 and P2 is selected such that the sum of them are roughly related to the total power, e.g. the total available power, P such that P=P1+P2, and wherein P1>P2. The SINR for the first user, e.g. the first wireless device 120, with a small path-gain g1, e.g. large path-loss, and the SINR for the second user, e.g. the second wireless device 130, with a large path-gain g2 may thus be estimated as $SINR1 = P1*g1/(P2*g1+I0+N)$ and $SINR2 = P2*g2/(I0+N)$, respectively, wherein I0 is Other Interference and N is Noise.

Action 303 relates to Action 201 previously described.

Action 304

The RNN 110 transmits to the first wireless device 120, an indication of how possible second data Data2 intended for the second wireless device 130 will be comprised in a signal to be transmitted from the RNN 110 to the first wireless device 120.

As will be described below, the first wireless device 120 may use the indication when decoding first data Data1 comprised in a signal received from the RNN 110, and which first data Data1 is intended for the first wireless device 120.

Action 304 relates to Action 202 previously described.

Action 305

In some embodiments, the RNN 110 receives the shared uplink pilot signal from the first wireless device 120 via a first channel and/or from the second wireless device 130 via a second channel.

The RNN 110 may receive the shared uplink pilot signal from the first wireless device 120 via the first channel and from the second wireless device 130 via the second channel.

Action 306

The RNN 110 estimates a combined channel based on a received shared uplink pilot signal from the first wireless device 120 and/or the second wireless device 130.

In some embodiments, wherein the RNN 110 may receive the shared uplink pilot signal from the first wireless device 120 via the first channel and from the second wireless device 130 via the second channel as described in Action 305 above, the RNN 100 may further estimate the combined channel as the combination of the first and second channels by means of least-square estimation or linear minimum mean-squared error estimation.

Action 306 relates to Action 204 previously described.

Action 307

The RNN 110 determines a beamforming vector for the estimated combined channel. The beamforming vector is used to transmit the signal from the RNN 110 to the first wireless device 120.

In some embodiments, the RNN 110 determines the beamforming vector by means of conjugate beam-forming, zero-forcing, or regularized zero-forcing.

Action 307 relates to Action 205 previously described.

Action 308

The RNN 110 may determine at least one decoding method to be used when decoding data comprised in the transmitted signal.

By determining the at least one decoding method to be used when decoding data comprised in the transmitted signal and by, as described in Action 309, transmitting information relating to the at least one decoding method only to the wireless device, e.g. the first wireless device 120, for which wireless device data comprised in the signal is intended for, the data intended for the first wireless device 120 is only decodable by the first wireless device 120. The at least one decoding method may be referred to as a specific decoding method in that it is specific for the first wireless device 120 in order to be able to decode the signal.

Action 309

In some embodiments, wherein the RNN 110 has determined the at least one decoding method as described in Action 308 above, the RNN 110 may further transmit information relating to the at least one decoding method to the first wireless device 120 and/or the second wireless device 130.

Action 310

In some embodiments, the RNN 110 combines the first data Data1 intended for the first wireless device 120 with the possible second data Data2 intended for the second wireless device 130 into the signal. Since the possible second data Data2 is intended for the second wireless device 130 and further is combined with the first data Data1, the possible second data Data2 is herein sometimes referred to as just second data Data2. By combining data intended for more than one wireless devices into a single signal, transmission resources will be saved and signalling overhead reduced.

The RNN 110 may combine the first data Data1 and the second data Data2 by superpositioning the first data Data1 and the second data Data2 using superpositioning coding.

Action 311

The RNN 110 transmits, by means of the beamforming vector, the signal to the first wireless device 120. The signal comprises the first data Data1 and the possible second data Data2, which first data Data1 is decodable only by the first wireless device 120.

As mentioned above in relation to Action 308, the first wireless device 120 will have information about the decoding method to be used when decoding the received signal, and thus, the first data Data1 is not decodable by the second wireless device 130 or any other wireless device operating in the wireless communications system 110.

Further, it should be understood that in some embodiments, the signal comprises both the first data Data1 and the second data Data2, which first data Data1 is decodable only by the first wireless device 120.

Action 311 relates to Action 206 previously described.

Action 312

In some embodiments, the RNN 110 assigns a dedicated uplink pilot signal to the first wireless device 120. Information relating to the assigned dedicated uplink pilot signal may be comprised in the first data Data1 of the signal transmitted to the first wireless device 120. As will be described below with reference to FIG. 12, this enables switching between a shared uplink pilot signal and a dedicated uplink pilot signal. If for example the first wireless device 120 has a large amount of data to be transmitted it may be advantageous to use the dedicated uplink pilot signal instead of the shared uplink pilot signal and thus a switching to the dedicated uplink pilot signal may be desired.

Action 313

In some embodiments, the RNN 110 receives the assigned dedicated uplink pilot signal from the first wireless device 120.

Figure 4:
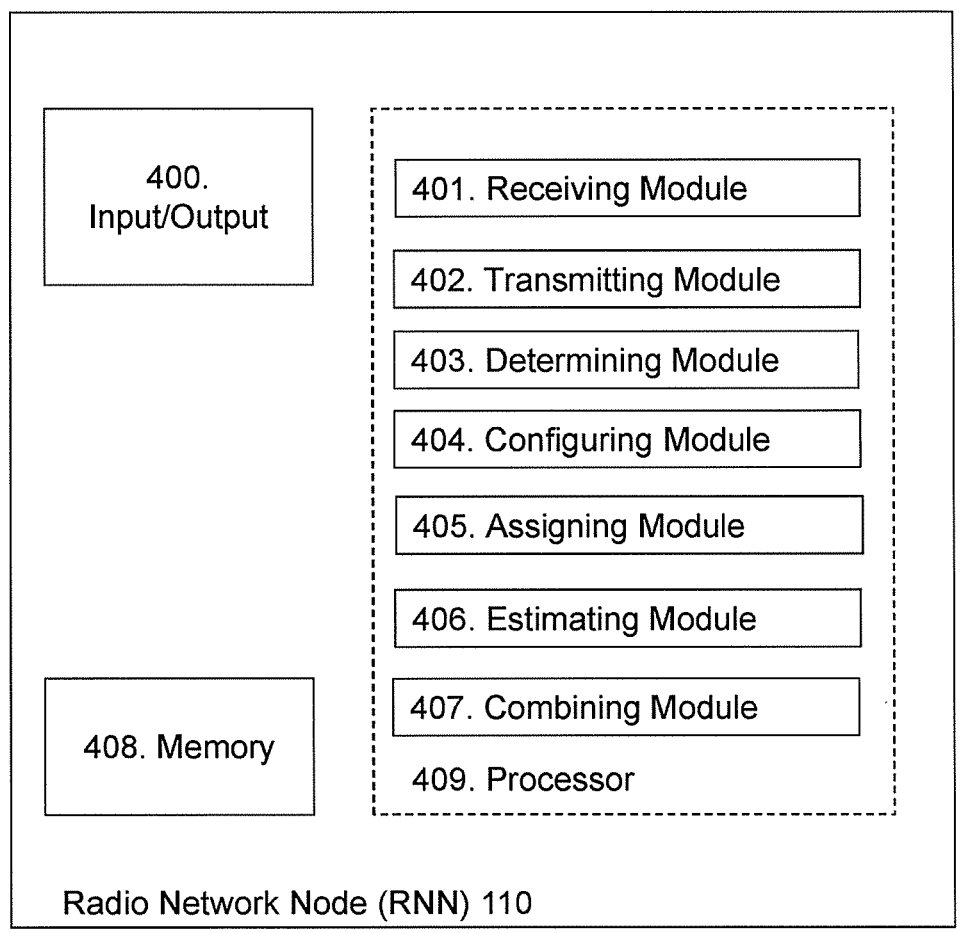
FIG. 4 is a schematic block diagram illustrating embodiments of a radio network node.

To perform the method for improving capacity in the wireless communication system 100, the RNN 110 may comprise an arrangement depicted in FIG. 4. As previously described, the RNN 110 is configured to serve the first wireless device 120 and the second wireless device 130 in the wireless communications system 100.

In some embodiments, the RNN 110 comprises an input and/or output interface 400 configured to communicate with one or more wireless devices, e.g. the first and second wireless devices 120,130, one or more radio nodes, and one or more other network nodes. The input and/or output interface 400 may comprise a wireless receiver (not shown) and a wireless transmitter (not shown).

The RNN 110 is configured to receive, e.g. by means of a receiving module 401 being configured to receive, signals, data or information from the first wireless device 120 and/or the second wireless device 130. The receiving module 401 may be implemented by the wireless receiver or by a processor 409 of the RNN 110. The processor 409 will be described in more detail below.

In some embodiments, the RNN 110 is configured to receive the shared uplink pilot signal from the first wireless device 120 via a first channel and/or from the second wireless device 130 via a second channel.

Further, the RNN 110 may receive the shared uplink pilot signal from the first wireless device 120 via the first channel and from the second wireless device 130 via the second channel.

In some embodiments, the RNN 110 is configured to receive the assigned dedicated uplink pilot signal from the first wireless device 120.

As will be described below the RNN 110 may be configured to assign a dedicated uplink pilot signal to the first wireless device 120, wherein information relating to the assigned dedicated uplink pilot signal is comprised in the first data Data1 of the signal transmitted to the first wireless device 120. In such embodiments, the RNN 100 is configured to receive the assigned dedicated uplink pilot signal from the first wireless device 120.

The RNN 110 is configured to transmit, e.g. by means of a transmitting module 402 being configured to transmit, signals, data or information to one or more wireless devices, e.g. the first and second wireless devices 120,130, one or more radio nodes, and one or more other network nodes. The transmitting module 402 may be implemented by the wireless transmitter or the processor 409 of the RNN 110.

The RNN 110 is configured to transmit, to the first wireless device 120, an indication of how possible second data Data2 intended for the second wireless device 130 will be comprised in a signal to be transmitted from the RNN 110 to the first wireless device 120.

Further, the RNN 110 is configure to transmit, by means of the beamforming vector, the signal to the first wireless device 120, wherein the signal comprises first data Data1 and the possible second data Data2, which first data Data1 is decodable only by the first wireless device 120.

In some embodiments, wherein the RNN 110 is configured to determine at least one decoding method to be used when decoding data comprised in the transmitted signal as will be described below, the RNN 110 is configured to transmit information relating to the at least one decoding method to the first wireless device 120 and/or the second wireless device 130.

The RNN 110 may be configured to determine, e.g. by means of a determining module 403 being configured to determine, a beamforming vector for the estimated combined channel. The determining module 403 may be implemented by the processor 409 of the RNN 110.

The RNN 110 may be configured to determine the beamforming vector by further being configured to determine the beamforming vector by means of conjugate beam-forming, zero-forcing, or regularized zero-forcing.

In some embodiments, the RNN 110 is configured to determine a difference in path loss between the first and second path losses.

The RNN 110 may be configured to determine at least one decoding method to be used when decoding data comprised in the transmitted signal.

The RNN 110 may be configured to perform, e.g. by means of a configuring module 404 being configured to configure, the first and second wireless devices 120,130. The configuring module 404 may be implemented by the processor 409 of the RNN 110.

In some embodiments, wherein the RNN 110 is configured to determine a difference in path loss between the first and second path losses, the RNN 110 is configured to configure the first and second wireless devices 120,130 to transmit the shared uplink pilot signal with a power compensation for the difference in path loss.

In some embodiments, the RNN 110 is configured to assign, e.g. by means of an assigning module 405 being configured to assign, a shared uplink pilot signal to the first wireless device 120 and to the second wireless device 130. The assigning module 405 may be implemented by the processor 409 of the RNN 110.

In some embodiments, the RNN 110 is configured to assign the shared uplink pilot signal to the first wireless device 120 and to the second wireless device 130 when a first path loss in a first communication between the first wireless device 120 and the RNN 110 is larger than a first threshold value, wherein a second path loss in a second communication between the second wireless device 130 and the RNN 110 is smaller than a second threshold value, and wherein the first threshold value is larger than the second threshold value.

The RNN 110 may be configured to assign a dedicated uplink pilot signal to the first wireless device 120, wherein information relating to the assigned dedicated uplink pilot signal is comprised in the first data Data1 of the signal transmitted to the first wireless device 120.

In some embodiments, the RNN 110 is configured to estimate, e.g. by means of an estimating module 406 being configured to estimate, a combined channel based on a received shared uplink pilot signal from the first wireless device 120 and/or the second wireless device 130. The estimating module 406 may be implemented by the processor 409 of the RNN 110.

In some embodiments, wherein the RNN 110 is configured receive the shared uplink pilot signal from the first wireless device 120 via the first channel and from the second wireless device 130 via the second channel, the RNN 110 is configured to estimate the combined channel based on the received shared uplink pilot signal by further being configured to estimate the combined channel as the combination of the first and second channels by means of least-square estimation or linear minimum mean-squared error estimation.

In some embodiments, the RNN 110 is configured to combine, e.g. by means of a combining module 407 being configured to combine, the first data Data1 intended for the first wireless device 120 with second data Data2 intended for the second wireless device 130 into the signal. The combining module 407 may be implemented by the processor 409 of the RNN 110.

In some embodiments, the RNN 110 is configured to combine the first data Data1 intended for the first wireless device 120 with second data Data2 intended for the second wireless device 130 into the signal by further being configured to superposition the first data Data1 and the second data Data2 using superpositioning coding.

The RNN 110 may also comprise means for storing data. In some embodiments, the RNN 110 comprises a memory 408 configured to store the data. The data may be processed or non-processed data and/or information relating thereto. The memory 408 may comprise one or more memory units. Further, the memory 408 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the RNN 110.

Embodiments herein for improving capacity in the wireless communications system 100 may be implemented through one or more processors, such as the processor 409 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the RNN 110. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the RNN 110.

Those skilled in the art will also appreciate that the receiving module 401, the transmitting module 402, the determining module 403, the configuring module 404, the assigning module 405, the estimating module 406, and the combining module 407 above may refer to a combination of analog and digital circuits, and/or one or more processors configured with software and/or firmware, e.g. stored in the memory 408, that when executed by the one or more processors such as the processors in the RNN 110 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 5:
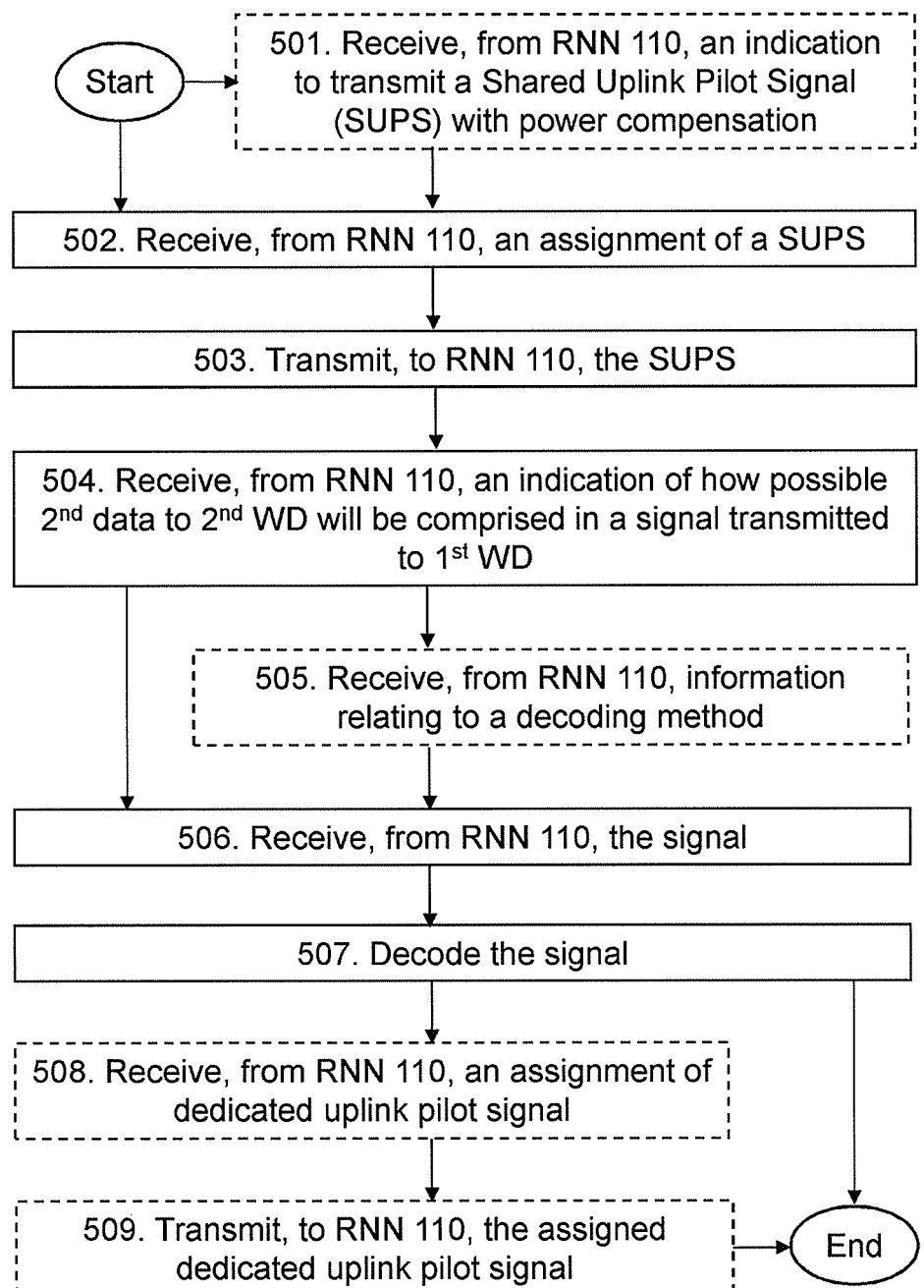
FIG. 5 is a flowchart depicting embodiments of a method performed by a wireless device.

Methods performed by the first wireless device 120 for improving capacity in the wireless communications system 100, will now be described with reference to the flow chart depicted in FIG. 5. As previously described, the RNN 110 serves the first wireless device 120 and the second wireless device 130 in the wireless communications system 100.

The method comprises one or more of the following actions. It should be understood that actions may be taken in any suitable order and that actions may be combined.

Action 501

In some embodiments, a first path loss in a first communication between the first wireless device 120 and the RNN 110 is larger than a first threshold value, and a second path loss in a second communication between the second wireless device 130 and the RNN 110 is smaller than a second threshold value, wherein the first threshold value is larger than the second threshold value.

The first wireless device 120 may receive, from the RNN 110, an indication to transmit the shared uplink pilot signal with a power compensation for path loss.

Action 502

The first wireless device 120 receives, from the RNN 110, an assignment of a shared uplink pilot signal to be used, wherein the shared uplink pilot signal is shared with the second wireless device 130. As previously mentioned, this will reduce the amount of pilot resources needed.

Action 503

The first wireless device 120 transmits the shared uplink pilot signal to the RNN 110, e.g. via a first channel. Thereby, the RNN 110 may receive information, e.g. CSI, about the first channel.

Action 503 relates to Action 203 previously described.

Action 504

The first wireless device 120 receives, from the RNN 110, an indication of how possible second data Data2 intended for the second wireless device 130 will be comprised in a signal to be transmitted from the RNN 110 to the first wireless device 120.

Thus, by the received indication, the first wireless device 120 will know how the possible second data Data2 is comprised in the signal, whereby the decoding of the signal is simplified.

Action 505

In some embodiments, the first wireless device 120 receives, from the RNN 110, information relating to at least one decoding method. As previously mentioned, by having information about the at least one decoding method, the first wireless device 120 will know how to decode the first data Data1 intended for it. Preferably, the first wireless device 120 is the only wireless device receiving information about the at least one decoding method and thus the first wireless device 120 is the only device able to decode the first data Data1.

Action 506

The first wireless device 120 receives, from the RNN 110, the signal, which signal comprises first data Data1 and the possible second data Data2, wherein the first data Data1 is decodable only by the first wireless device 120.

Action 507

The first wireless device 120 decodes the first data Data1 from the received signal taking into account the indication of how the possible second data Data2 is comprised in the received signal.

In some embodiments, when the first wireless device 120 receives, from the RNN 110, information relating to at least one decoding method, as described in Action 505 above, the RNN 110 may decode the first data Data1 from the received signal using the at least one decoding method.

The first wireless device 120 may decode the first data Data1 from the received signal taking into account the indication of how the possible second data Data2 is comprised in the received signal by decoding one or more first symbols comprised in the first data Data1 and intended for the first wireless device 120 by treating, by means of the received indication, one or more second symbols comprised in the possible second data Data2 as noise.

Alternatively, the first wireless device 120 may decode the first data Data1 from the received signal taking into account the indication of how the possible second data Data2 is comprised in the received signal by decoding one or more first symbols comprised in the first data Data1 and intended for the first wireless device 120 by determining, by means of the received indication, one or more second symbols comprised in the possible second data Data2 and by means of successive interference cancellation, removing the one or more second symbols from the received signal.

Action 508

In some embodiments, the first wireless device 120 receives, from the RNN 110, an assignment of a dedicated uplink pilot signal.

As previously mentioned, when the first wireless device 120 for example have a large amount of data it may preferably to use a dedicated uplink pilot signal instead of the shared uplink pilot signal. In such scenarios, the first wireless device 120 may receive the assignment of the dedicated uplink pilot signal.

Action 509

The first wireless device 120 may transmit, to the RNN 110, the assigned dedicated uplink pilot signal.

Figure 6:
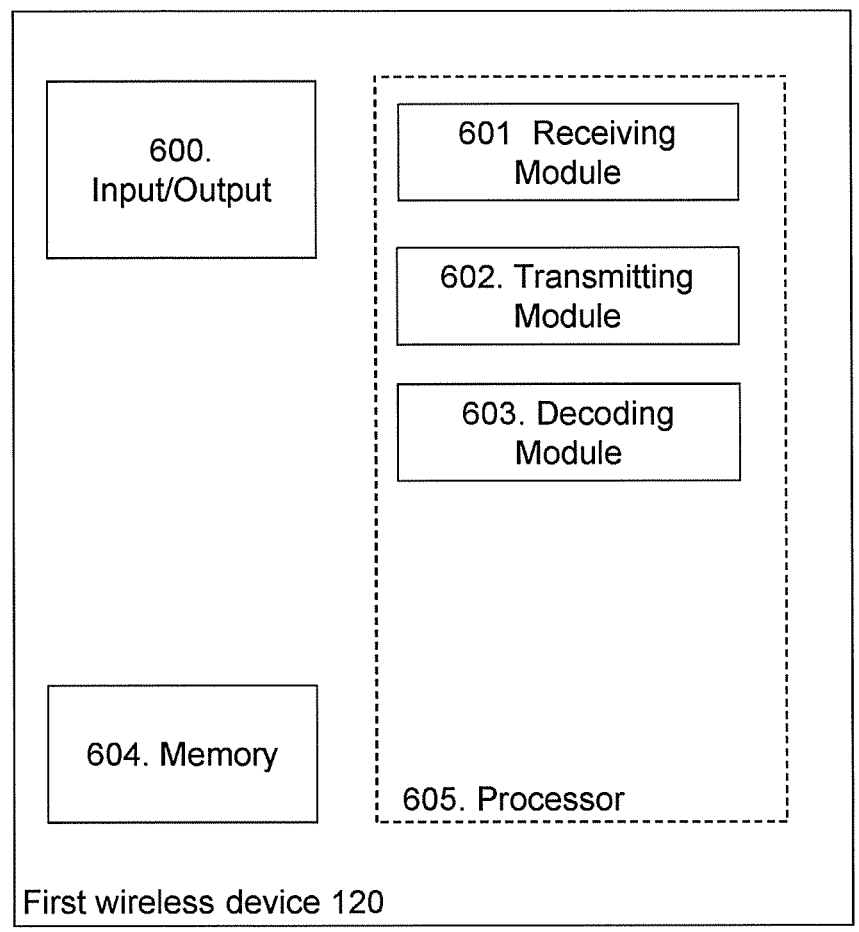
FIG. 6 is a schematic block diagram illustrating embodiments of a wireless device.

To perform the method for improving capacity in the wireless communications system 100, the first wireless device 120 may comprise an arrangement depicted in FIG. 6. As previously mentioned, the RNN 110 is configured to serve the first wireless device 120 and the second wireless device 130 in the wireless communications system 100.

In some embodiments, the first wireless device 120 comprises an input and/or output interface 600 configured to communicate with one or more wireless devices, such as the, one or more radio nodes, such as the RNN 110, and/or one or more other network nodes. The input and/or output interface 600 may comprise a wireless receiver (not shown) and a wireless transmitter (not shown).

The first wireless device 120 is configured to receive, e.g. by means of a receiving module 601 configured to receive, from the RNN 110, an assignment of a shared uplink pilot signal to be used, wherein the shared uplink pilot signal is shared with the second wireless device 130. The receiving module 601 may be implemented by the wireless receiver or a processor 605 of the first wireless device 120. The processor 605 will be described in more detail below.

Further, the first wireless device 120 is configured to receive, from the RNN 110, an indication of how possible second data Data2 intended for the second wireless device 130 will be comprised in a signal to be transmitted from the RNN 110 to the first wireless device 120.

Furthermore, the first wireless device 120 is configured to receive, from the RNN 110, the signal. The signal comprises first data Data1 and the possible second data Data2, wherein the first data Data1 is decodable only by the first wireless device 120.

In some embodiments, a first path loss in a first communication between the first wireless device 120 and the RNN 110 is larger than a first threshold value, and a second path loss in a second communication between the second wireless device 130 and the RNN 110 is smaller than a second threshold value, wherein the first threshold value is larger than the second threshold value.

The first wireless device 120 may further be configured to receive, from the RNN 110, an indication to transmit the shared uplink pilot signal with a power compensation for path loss.

In some embodiments, the first wireless device 120 is configured to receive, from the RNN 110, information relating to at least one decoding method.

The first wireless device 120 may further be configured to receive, from the RNN 110, an assignment of a dedicated uplink pilot signal to be used.

The first wireless device 120 is configured to transmit, e.g. by means of a transmitting module 602 configured to transmit, the shared uplink pilot signal to the RNN 110, e.g. via a first channel.

The transmitting module 602 may be the wireless transmitter (not shown) or the processor 605 of the first wireless device 120.

In some embodiments, wherein the first wireless device 120 is configured to receive, from the RNN 110, an assignment of a dedicated uplink pilot signal to be used, as previously described, the first wireless device 120 may be configured to transmit, to the RNN 110, the assigned dedicated uplink pilot signal.

The RNN 110 is configured to determine, e.g. by means of a decoding module 603 configured to decode, the first data Data1 from the received signal taking into account the indication of how the possible second data Data2 is comprised in the received signal.

The decoding module 603 may be implemented by the processor 605 of the first wireless device 120.

In some embodiments, when the first wireless device 120 is configured to receive, from the RNN 110, information relating to at least one decoding method as previously described, the first wireless device 120 is configured to decode the first data Data1 from the received signal by further being configured to decode the first data Data1 from the received signal using the at least one decoding method.

The first wireless device 120 may be configured to decode the first data Data1 from the received signal taking into account the indication of how the possible second data Data2 is comprised in the received signal by further being configured to decode one or more first symbols comprised in the first data Data1 and intended for the first wireless device 120 by treating, by means of the received indication, one or more second symbols comprised in the possible second data Data2 as noise.

Alternatively, the first wireless device 120 may be configured to decode the first data Data1 from the received signal taking into account the indication of how the possible second data Data2 is comprised in the received signal by further being configured to decode one or more first symbols comprised in the first data Data1 and intended for the first wireless device 120 by determining, by means of the received indication, one or more second symbols comprised in the possible second data Data2, and by means of successive interference cancellation, remove the one or more second symbols from the received signal.

The first wireless device 120 may also comprise means for storing data. In some embodiments, the first wireless device 120 comprises a memory 604 configured to store the data. The data may be processed or non-processed data and/or information relating thereto. The memory 604 may comprise one or more memory units. Further, the memory 604 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the first wireless device 120.

Embodiments herein for improving capacity in the wireless communications system 100 may be implemented through one or more processors, such as the processor 605 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the first wireless device 120. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first wireless device 120.

Those skilled in the art will also appreciate that the receiving module 601, the transmitting module 602, and the decoding module 603 above may refer to a combination of analog and digital circuits, and/or one or more processors configured with software and/or firmware, e.g. stored in the memory, that when executed by the one or more processors such as the processors in the first wireless device 120 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Embodiments

Some exemplifying embodiments will now be described in more detail. It should be understood that it is possible to alter these embodiments slightly, for example, by utilizing different power control settings, modulation techniques and get a very large number of different embodiments, but the techniques for altering in this fashion is quite clear from prior art and available literature, and is therefore not described in any more detail here.

In some embodiments herein, a set of wireless devices, e.g. the first and second wireless devices 120,130, share an UL-pilot signal and a joint beam-forming vector is formed for the channel formed by the super-positioning of the UL channels of the set of wireless devices, e.g. the first and second wireless devices 120,130. By altering the UL-power setting for the shared UL-pilot signal, different superposition-channels with different properties may be formed. With knowledge about the UL-average gain of the wireless devices, e.g. the first and second wireless devices 120,130, and the amount of data for each wireless device, a link-adaptation decision for how to code information in the DL-transmission may be made to multiplex data between the wireless devices, e.g. the first and second wireless devices 120,130, by utilizing, for example, modulation, coding and/or interference suppression techniques. This relates to Actions 201,202,204,205,205,303, 304,306,307, and 311 described above.

Some First Embodiments: User Pairing for Non Orthogonal Multiple Access (NOMA)

A technique to improve the performance is to utilize Non-Orthogonal Multiple Access (NOMA) schemes in spatial domain by utilizing that some users have very good channel, e.g. high gain, and some users have bad channel, e.g. low gain. The technique then exploits the logarithmic capacity of the channel by multiplex such users.

To resolve the coherence block limitation, T, described above, a method to reuse the same pilot for different wireless devices, e.g. the first and second wireless devices 120,130, in the same cell is provided. The RNN 110 allocates the same pilot, e.g. the shared uplink pilot signal, for two different wireless devices, e.g. the first and second wireless devices 120,130, where one of the wireless devices, e.g. the first wireless device 120, has a small path loss while the other wireless device, e.g. the second wireless device 130, has a higher path loss. For example, this relates to Actions 201 and 303 described above. Since they are using the same pilot, e.g. the shared uplink pilot signal, the RNN 110 may not distinguish their channel responses. However, the RNN 110 may estimate a linear combination of the channels to both the wireless devices, e.g. the first and second wireless devices 120,130, from the pilot transmission.

This estimate provides a description of the combined channel; and the applied power control determines which linear combination is seen by the RNN 110. For example, this relates to the Actions 204 and 306 described above. In some embodiments, power control is used to compensate for the difference in UL-gain so that the pilot signal strengths of the two wireless devices, e.g. the first and second wireless devices 120,130, is equalized. For example, this relates to the Action 302 described above. In some embodiments, power control compensates for also the difference in DL path loss. In some embodiments, a path loss compensation mechanism is used. Hence if it is wanted to set the power $P_{RS}$ used to transmit the UL reference symbol, e.g. the uplink pilot signal, a value may be set for the wanted received power $P_{TARGET}$ to be in the RNN 110 and the transmit power may be set to a certain fraction $\alpha$ of the path loss PL.

$$P_{RS}=\min\{P_{CMAX}, P_{TARGET}\alpha \cdot PL\}$$

Hence the path loss compensation factor, e.g. PL in dB, may for some embodiments herein be such that $\alpha>1$ in comparison to regular LTE power control when $\alpha\leq 1$, $\alpha=1$ is equivalent to that the received power at the RNN 110 is the same $P_{TARGET}$ for all wireless devices, e.g. the first and second wireless devices 120,130, sharing the UL-pilot, $\alpha=2$ is more or less equivalent to that the expected DL-received power when the RNN 110 is beam-forming using the super-position channel is the same at the wireless devices, e.g. the first and second wireless devices 120,130. The super-position channel is herein sometimes also referred to as the combined channel.

Figure 7:
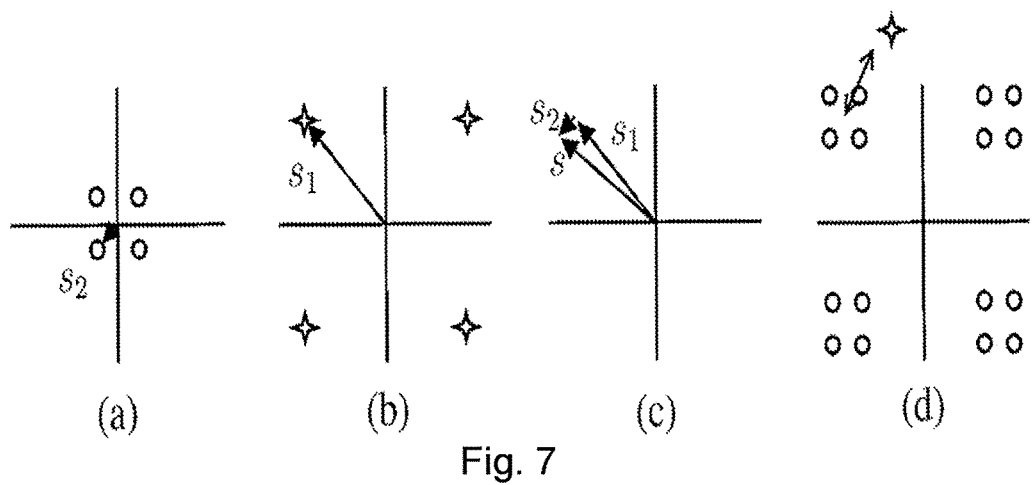
FIG. 7 schematically illustrates examples of encoding of superposition codes according to embodiments herein.

The RNN 110 then beam-forms a combination of the different symbols for the different wireless devices, e.g. the first and second wireless devices 120,130, using this super-position estimate of the channel. For example, this relates to the Actions 205, 206, 307, 310, and 311 described above. The technique is to super-impose the information for the low path-loss user, e.g. the second wireless device 130, on top of the constellation of the high path-loss user, e.g. the first wireless device 120, with low power, e.g. low magnitude, see FIG. 7. FIG. 7 schematically illustrates examples of encoding of superposition codes. In the illustrated example, the Quadrature Phase Shift Keying (QPSK) symbol $S_2$ for the second wireless device 130 is superimposed on top of the QPSK symbol $S_1$ for the first wireless device 120. FIG. 7a schematically illustrates the QPSK symbol $S_2$ intended for the second wireless device 130, and FIG. 7b schematically illustrates the QPSK symbol $S_1$ intended for the first wireless device 120. FIG. 7c schematically illustrates the signal S, e.g. the superimposed signal, that is sent from the RNN 110 to for example the first wireless device 120, and FIG. 7d shows the resulting non-uniform 16 Quadrature Amplitude Modulation (QAM) constellation points.

The high path loss wireless device, e.g. the first wireless device 120, may perform the decoding by treating the inter-user interference as noise. The close wireless device, e.g. the second wireless device 130, may deduce the constellations used for the high-loss user, for example, by decoding the other wireless device's data and then performs interference cancellation before decoding its own data. For example, this relates to the Actions 207 and 507 described above.

The following is one possible implementation of the encoding according to embodiments herein:
1. The RNN 110 assigns the same pilot, e.g. the shared uplink pilot signal, to multiple wireless devices, e.g. the first and second wireless devices 120,130. This relates to Actions 201 and 303.
2. The wireless devices, e.g. the first wireless device 120 and/or the second wireless device 130, send the requested pilot using power control that provides received pilot signal strength in a given range. This relates to Actions 203 and 503.
3. The RNN 110 estimates the combination of the channels using a conventional estimation technique, such as the Least-Square (LS) estimation or Linear Minimum Mean-Squared Error (LMMSE) estimation. This relates to Actions 204 and 306.
4. The RNN 110 combines the data intended for the two wireless devices, e.g. the first and second wireless devices 120,130, using superposition coding and beam-forms the resulting signal based on the estimated channel. This relates to Action 310.
5. The wireless devices, e.g. the first wireless device 120 and the second wireless device 130, decode their respective symbols by either treating the other symbol as noise or by using successive interference cancellation. This relates to Actions 207 and 507.

As mentioned above, FIG. 7 shows an exemplifying scheme wherein the second wireless device's 130, QPSK symbol $S_2$ is superimposed on top of the first wireless device's 120, QPSK symbol $S_1$.

Figure 8:
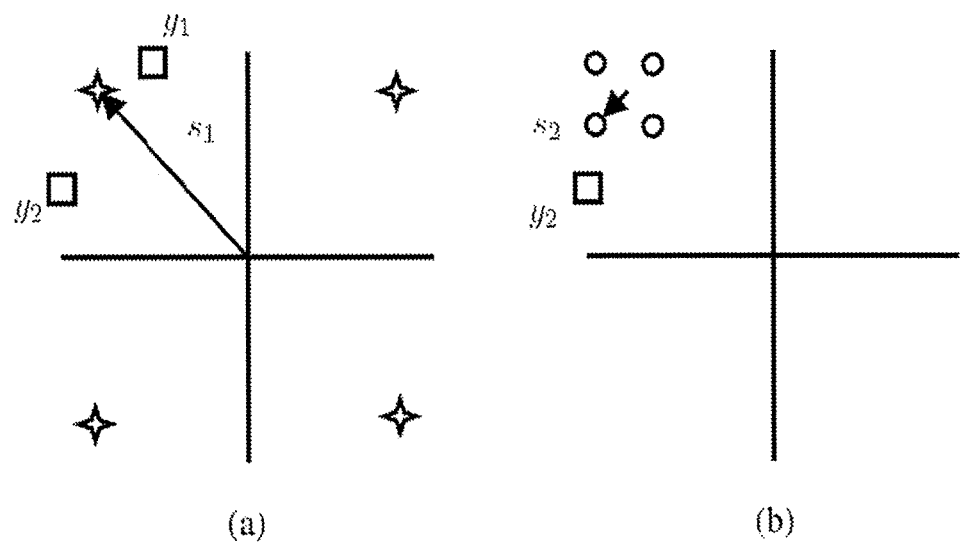
FIG. 8 schematically illustrates examples of decoding of superposition codes according to embodiments herein.

An exemplifying decoding process is shown in FIG. 8 for the same case. The first wireless device 120 may decode its symbol $S_1$, by treating the superimposed symbol $S_2$ intended for the second wireless device 130 as extra addition noise. The wireless second wireless device 130 may decode the symbols $S_1, S_2$ intended for the wireless devices using successive interference cancellation. Note that the interference cancellation is done stream by stream in which the strong channel code may make sure that the decoded symbols are correct with high probabilities.

FIG. 8a schematically illustrates the respective signal $y_1$ and $y_2$ received at the first and second wireless device 120,130 respectively, and the decoding of the symbol $S_1$ for both of the first and the second wireless device 120,130. FIG. 8b schematically illustrates the decoding of the signal $S_2$ at the second wireless device 130 after subtracting the interference of the signal $S_1$ intended for the first wireless device 120. The first wireless device 120 decodes its intended QPSK symbol, $S_1$, directly by treating interference as noise. Further, the second wireless device 130 decodes the QPSK symbol $S_1$ intended for the first wireless device 120 and then continues by decoding the QPSK symbol $S_2$ intended for the second wireless device 130.

Figure 9:
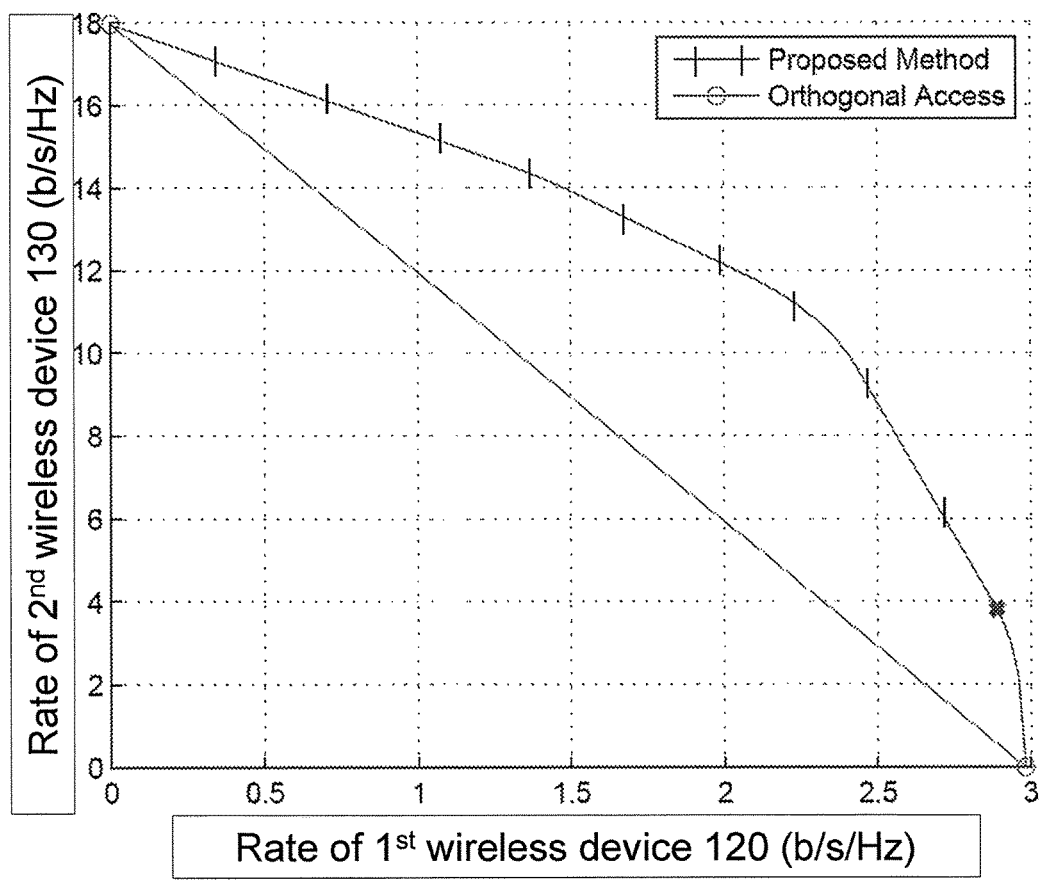
FIG. 9 schematically illustrates an example of a rate region according to embodiments herein.

One example of a rate region of the RNN 110 estimating the linear combination from the two wireless devices, e.g. the first wireless device 120 and the second wireless device 130, using the same pilot is schematically shown in FIG. 9. The rate region is the information theoretic bounds on a rate pairs, e.g. on the two rates for two wireless devices such as the first wireless device 120 and the second wireless device 130, that the wireless devices, e.g. the first and second wireless devices 120,130, may jointly achieve. Hence in theory, any point in the rate region may be achieved e.g. any point below the curves in FIG. 9 may be achieved. For example, consider in FIG. 9 that the first wireless device 120 achieves 2 bits/Hz/s then the second wireless device 130 may achieve at most around 6 bit/Hz/s using orthogonal access, e.g. time and/or frequency multiplexing, and at most around 12 bits/Hz/s using superposition coding according to embodiments herein. With today's channel coding techniques, the bounds may be achieved with only a very small gap from the boundary. The example in FIG. 9 was generated by varying the received power of the shared uplink pilot signals and/or the power allocation in the super position encoding of the two wireless devices, e.g. the first and second wireless device 120,130, which receiver power determines the form of the beam-forming vector. Further, FIG. 9 was generated by varying the downlink transmit power of the two intended symbols, e.g. $S_1$ and $S_2$, with constraints on both the pilot signal power and the downlink signal power. The rate region is obtained by computing the closed form instantaneous achievable rate for a given channel realization using information theoretical analysis and averaged over Monte-Carlo simulations of Rayleigh fading channel realizations. In FIG. 9 parameters are chosen as M=100, normalized downlink power is chosen as 1, the path loss of the first wireless device 120 is 0.25 and the path loss of the second wireless device 130 is 2500. That is a 40 dB difference, about a factor of 10 in the distance between the respective wireless device and the RNN 110. The main advantage of this scheme is that the rate region is much larger than with orthogonal schemes in which only one of the wireless devices is served in one resource block.

By using the proposed scheme the RNN 110 may serve both wireless devices, e.g. the first and second wireless device 120,130, in the same time-frequency resource. The unusable information-theoretic rate of 18 b/s/Hz of the second wireless device 130 may be shared among the wireless devices. The RNN 110 may simultaneously serve the first wireless device 120 with a rate of 2.9 b/s/Hz and the second wireless device 130 with a rate of 3.9 b/s/Hz, as indicated with the marked point in FIG. 9.

Figure 10:
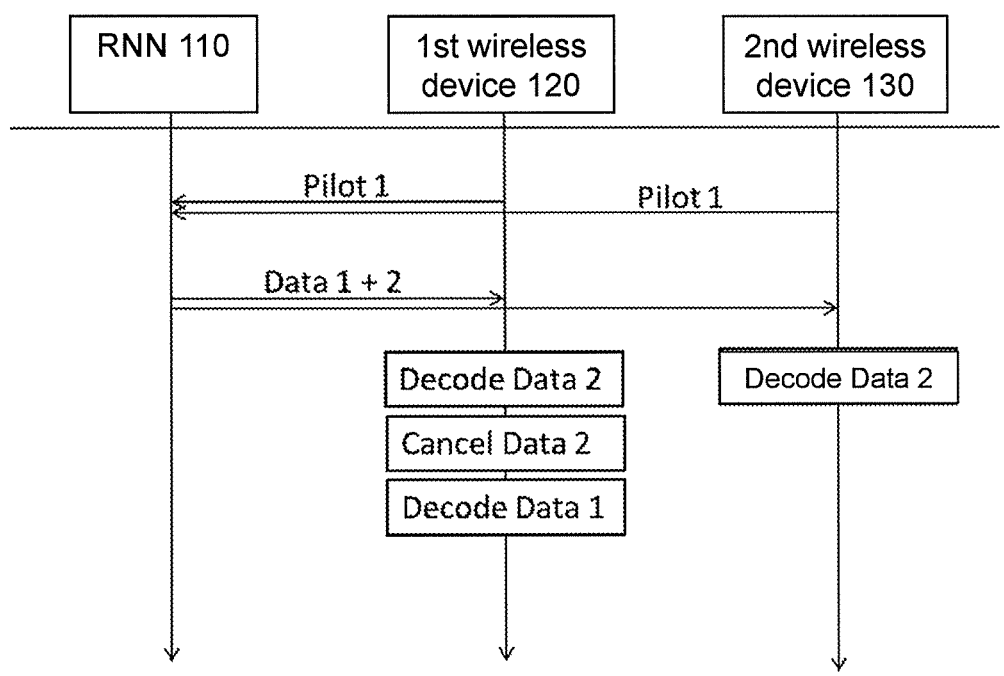
FIG. 10 schematically illustrates an example of a Successive Interference Cancellation (SIC) implementation according to embodiments herein.

FIG. 10 schematically illustrates an exemplary Successive Interference Cancellation (SIC) implementation.

It is to be noted that any control signaling embedded into second data Data2 intended to the second wireless device 130 may potentially be read by the first wireless device 120, hence for the purpose of enabling the first wireless device 120, to decode the second data Data2 in current and future transmissions then some embodiments may configure the first wireless device 120 to read control data sent towards the second wireless device 130. As schematically illustrated in FIG. 10, the first and second wireless device 120,130 transmits a respective shared uplink pilot signal to the RNN 110. In FIG. 10, the shared uplink pilot signal is referred to as Pilot1. The RNN 110 transmits a signal comprising first data Data1 and second data Data2 to the first and second wireless devices 120,130. In FIG. 10, the first data Data1 and second data Data2 is referred to as Data1+2. The first wireless device 120 decodes and removes the second data Data2 from the received signal and then decodes the first data Data 1 intended for the first wireless device 120. The second wireless device 130 decodes the second data Data2 intended for the second wireless device 130 from the received signal.

In some embodiments, other encoding techniques may be used. For example, for the special case with power control α=2 joint coding may be used. As previously mentioned, α=2 is more or less equivalent to that the expected DL-received power, when the RNN 110 is beam-forming using the super-position channel, is the same at the the first and second wireless devices 120,130. In this scenario both wireless devices, e.g. the first and second wireless devices 120,130, may decode the complete code word as both first and second wireless devices 120,130 experience a similar SINR and thus both wireless devices get the full coding gain and may after decoding extract the relevant information from the decoded data, for example, using an embedded header. This is schematically illustrated in FIG. 11 as joint coding and decoding.

Figure 11:
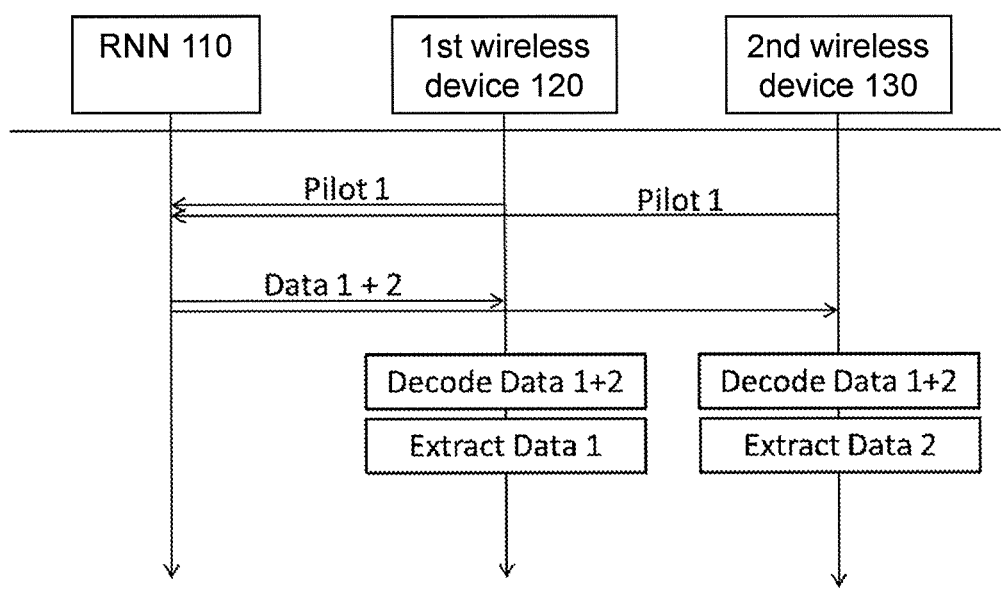
FIG. 11 schematically illustrates an example of joint coding and decoding according to embodiments herein.

As schematically illustrated in FIG. 11, the first and second wireless device 120,130 transmits a respective shared uplink pilot signal to the RNN 110. In FIG. 11, the shared uplink pilot signal is referred to as Pilot1. The RNN 110 transmits a signal comprising first data Data1 and second data Data2 to the first and second wireless devices 120,130. In FIG. 11, the first data Data1 and second data Data2 is referred to as Data1+2. The first wireless device 120 decodes the first and second data Data1,Data2,Data1+2 from the received signal and extracts the first data Data 1 intended for the first wireless device 120. The second wireless device 130 decodes the first and second data Data1,Data2,Data1+2 from the received signal and extracts the second data Data2 intended for the second wireless device 130.

In some embodiments, a fixed power control setting is used, for example, α=2 and the link adaptation between the wireless devices, e.g. the first and second wireless devices 120,130, is only in the encoding of the data in the downlink transmission; that is, the average path loss of the wireless devices, e.g. the first and second wireless devices 120,130, is known and hence the experienced SINR may be estimated and any of the described encoding techniques may be used depending on the set of wireless devices, e.g. the first and second wireless devices 120,130, and their estimated SINRs.

Some Second Embodiments: Shared/Dedicated UL-Pilot Assignment by Multiplexed Control Signaling As described above, embodiments may improve throughput for some scenarios. Hence it is to be used selectively, for example, for initial transmissions or selectively for a subset of wireless devices, e.g. the first and/or second wireless devices 120,130, with less data to transmit, lower data-rate requirements and only for pairs of wireless devices, e.g. the first wireless device 120 and second wireless device 130, that are suitable to pair as described above. This implies that a method for selection of wireless devices for which to deploy the proposed techniques may be an important consideration.

In some embodiments, the usage of the technique is limited to the case when the number of wireless devices exceeds a threshold; for example, the number of wireless devices exceeds the number of orthogonal uplink pilots. In some embodiments a wireless device is assigned a shared UL-pilot, e.g. the shared uplink pilot signal, and when the wireless device, e.g. the first wireless device 120 or the second wireless device 130, has a large amount of data to transmit it is assigned a dedicated UL-pilot.

Figure 12:
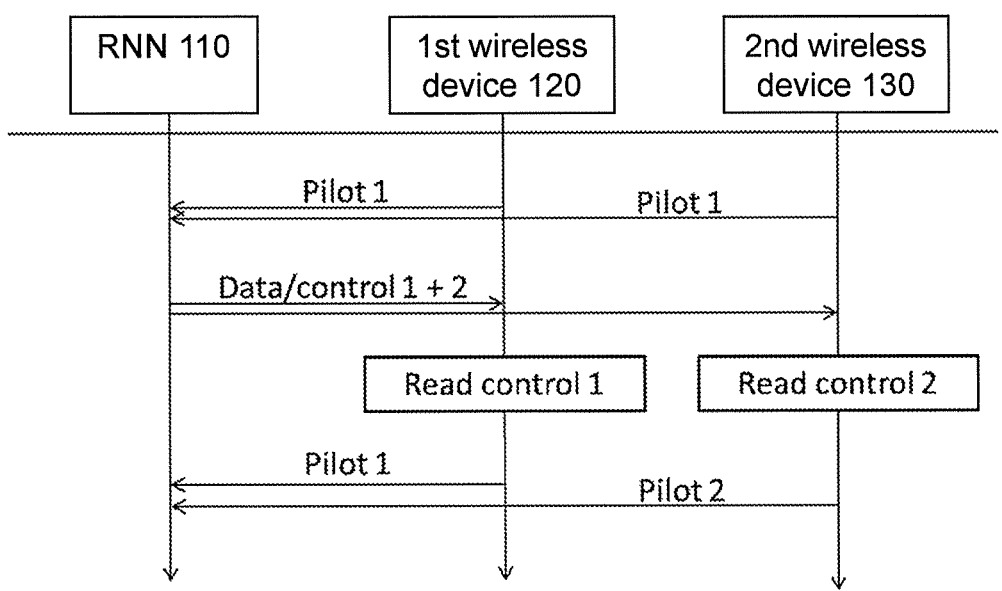
FIG. 12 schematically illustrates an example of embedded control signalling and pilot reassignment according to embodiments herein.

For the purpose of some embodiments disclosed herein, the impact of the state switching is that in a massive MIMO system, the wireless devices may be seamlessly switched between a shared and a dedicated UL-pilot, e.g. between the shared uplink pilot signal and a dedicated uplink pilot signal. In particular, the switching from a shared UL-pilot towards a dedicated pilot may be done using attached control-signaling in the data-transmission. This is schematically illustrated in FIG. 12. FIG. 12 schematically illustrates embedded control signaling and pilot reassignment.

As schematically illustrated in FIG. 12, the first and second wireless device 120,130 transmits a respective shared uplink pilot signal to the RNN 110. In FIG. 12, the shared uplink pilot signal is referred to as Pilot. The RNN 110 transmits a signal comprising first data Data1 and second data Data2 to the first and second wireless devices 120,130. The signal may also comprise first and second control data intended for the respective wireless device. In FIG. 12, this is illustrated as Data/control1+2. From the received signal, the first wireless device 120 reads first control data Control1 intended for the first wireless device 120. For example, the first control data Control1 may instruct the first wireless device 120 to continue to use the shared uplink pilot signal Pilot1 and thus the first wireless device 120 transmits the shared uplink pilot signal Pilot1 to the RNN 110. From the received signal, the second wireless device 130 reads second control data Control2 intended for the second wireless device 130. For example, the second control data Control2 may instruct the second wireless device 130 to use a dedicated uplink pilot signal Pilot2 and thus the second wireless device 130 transmits the dedicated uplink pilot signal Pilot2 to the RNN 110.

Some Third Embodiments: Power Command Settings and Encoding Parameters

As described above with reference to FIG. 9, rate adaptation for wireless devices, e.g. the first and second wireless devices 120,130, using a shared pilot, e.g. the share uplink pilot signal, may be achieved by means of power setting commands for the UL-pilot and DL-modulation and encoding settings. These commands may also be attached and decoding as described above and schematically illustrate in FIG. 12 above.

When using the word "comprise" or "comprising" it shall be interpreted as non-limiting, i.e. meaning "consist at least of". Further, when using the word "a", or "an" herein it should be interpreted as "at least one", "one or more", etc.

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed by a Radio Network Node (RNN), wherein the RNN serves a first wireless device and a second wireless device in a wireless communications system, the method comprising:
   assigning a shared uplink pilot signal to the first wireless device and to the second wireless device;
   transmitting, to the first wireless device, an indication of how possible second data intended for the second wireless device will be comprised in a transmission signal to be transmitted from the RNN to the first wireless device;
   estimating a combined channel based on a received shared uplink pilot signal from the first wireless device and/or the second wireless device;
   determining a beamforming vector for the estimated combined channel; and
   transmitting, by using the beamforming vector, the transmission signal to the first wireless device, wherein
   the transmission signal comprises first data and the possible second data and
   the first data is decodable only by the first wireless device.

2. The method of claim 1, wherein
   the assigning of the shared uplink pilot signal to the first wireless device and to the second wireless device comprises assigning the shared uplink pilot signal when a first path loss in a first communication between the first wireless device and the RNN is larger than a first threshold value,
   a second path loss in a second communication between the second wireless device and the RNN is smaller than a second threshold value, and
   the first threshold value is larger than the second threshold value.

3. The method of claim 1, further comprising:
   determining a difference in path loss between the respective first and second wireless devices and the RNN, and
   configuring the first and second wireless devices to transmit the shared uplink pilot signal with a power compensation for the difference in path loss.

4. The method of claim 1, further comprising:
   combining the first data intended for the first wireless device with second data intended for the second wireless device into the transmission signal.

5. The method of claim 1, further comprising:
   receiving the shared uplink pilot signal from the first wireless device via a first channel and/or from the second wireless device via a second channel.

6. The method of claim 1, wherein the determining of the beamforming vector further comprises:
   determining the beamforming vector by means of conjugate beam-forming, zero-forcing, or regularized zero-forcing.

7. The method of claim 1, further comprising:
   determining at least one decoding method to be used when decoding data comprised in the transmission signal, and
   transmitting information relating to the at least one decoding method to the first wireless device and/or the second wireless device.

8. The method of claim 1, further comprising:
   assigning a dedicated uplink pilot signal to the first wireless device, wherein information relating to the assigned dedicated uplink pilot signal is comprised in the first data of the transmission signal; and
   receiving the assigned dedicated uplink pilot signal from the first wireless device.

9. A Radio Network Node (RNN), wherein the RNN is configured to serve a first wireless device and a second wireless device in a wireless communications system, the RNN comprising:
   a memory; and
   processing unit, wherein the processing unit is configured to:
     assign a shared uplink pilot signal to the first wireless device and to the second wireless device;
     transmit, to the first wireless device, an indication of how possible second data intended for the second wireless device will be comprised in a transmission signal to be transmitted from the RNN to the first wireless device;
     estimate a combined channel based on a received shared uplink pilot signal from the first wireless device and/or the second wireless device;
     determine a beamforming vector for the estimated combined channel; and
     transmit, by using the beamforming vector, the transmission signal to the first wireless device, wherein
     the transmission signal comprises first data and the possible second data, and
     the first data is decodable only by the first wireless device.

10. The RNN of claim 9, wherein
    the processing unit is configured to assign the shared uplink pilot signal to the first wireless device and to the second wireless device when a first path loss in a first communication between the first wireless device and the RNN is larger than a first threshold value,
    a second path loss in a second communication between the second wireless device and the RNN is smaller than a second threshold value, and
    the first threshold value is larger than the second threshold value.

11. The RNN of claim 9, wherein the processing unit is further configured to:
  combine the first data intended for the first wireless device with second data intended for the second wireless device into the transmission signal.

12. A method performed by a first wireless device, wherein a Radio Network Node (RNN), serves the first wireless device and a second wireless device in a wireless communications system, the method comprising:
  receiving, from the RNN, an assignment of a shared uplink pilot signal to be used, wherein the shared uplink pilot signal is shared with the second wireless device;
  transmitting the shared uplink pilot signal to the RNN;
  receiving, from the RNN, an indication of how possible second data intended for the second wireless device will be comprised in a transmission signal to be transmitted from the RNN to the first wireless device;
  receiving, from the RNN, the transmission signal, wherein transmission signal comprises first data and the possible second data and the first data is decodable only by the first wireless device; and
  decoding the first data from the received transmission signal taking into account the indication of how the possible second data is comprised in the received transmission signal.

13. The method of claim 12, wherein
  a first path loss in a first communication between the first wireless device and the RNN is larger than a first threshold value,
  a second path loss in a second communication between the second wireless device and the RNN is smaller than a second threshold value, and
  the first threshold value is larger than the second threshold value.

14. The method of claim 12, further comprising:
  receiving, from the RNN, an indication to transmit the shared uplink pilot signal with a power compensation for path loss.

15. The method of claim 12, further comprising:
  receiving, from the RNN, information relating to at least one decoding method, wherein decoding the first data from the received transmission signal comprises decoding the first data (Data1) from the received transmission signal using the at least one decoding method.

16. The method of claim 12, wherein decoding the first data from the received transmission signal taking into account the indication of how the possible second data is comprised in the received transmission signal further comprises:
  decoding one or more first symbols comprised in the first data and intended for the first wireless device by treating, by using the received indication, one or more second symbols comprised in the possible second data as noise.

17. The method of claim 12, wherein decoding the first data from the received transmission signal taking into account the indication of how the possible second data is comprised in the received transmission signal further comprises:
  decoding one or more first symbols comprised in the first data and intended for the first wireless device by determining, by using the received indication, one or more second symbols comprised in the possible second data; and
  by using successive interference cancellation, removing the one or more second symbols from the received transmission signal.

18. The method of claim 12, further comprising:
  receiving, from the RNN, an assignment of a dedicated uplink pilot signal to be used; and
  transmitting, to the RNN, the assigned dedicated uplink pilot signal.

19. A first wireless device, wherein a Radio Network Node (RNN) is configured to serve the first wireless device and a second wireless device in a wireless communications system, the first wireless device comprising:
  a memory; and
  processing unit, wherein the processing unit is configured to:
    receive, from the RNN, an assignment of a shared uplink pilot signal to be used, wherein the shared uplink pilot signal is shared with the second wireless device;
    transmit the shared uplink pilot signal to the RNN;
    receive, from the RNN, an indication of how possible second data intended for the second wireless device will be comprised in a transmission signal to be transmitted from the RNN to the first wireless device;
    receive, from the RNN, the transmission signal, wherein the transmission signal comprises first data and the possible second data and the first data is decodable only by the first wireless device; and
    decode the first data from the received transmission signal taking into account the indication of how the possible second data is comprised in the received transmission signal.

20. The method of claim 19, wherein
  a first path loss in a first communication between the first wireless device and the RNN is larger than a first threshold value,
  a second path loss in a second communication between the second wireless device and the RNN is smaller than a second threshold value, and
  the first threshold value is larger than the second threshold value.

* * * * *